(12) United States Patent
Coursey

(10) Patent No.: US 12,210,849 B1
(45) Date of Patent: Jan. 28, 2025

(54) METHOD FOR AI LANGUAGE SELF-IMPROVEMENT AGENT USING LANGUAGE MODELING AND TREE SEARCH TECHNIQUES

(71) Applicant: Kino High Coursey, Colleyville, TX (US)

(72) Inventor: Kino High Coursey, Colleyville, TX (US)

( * ) Notice: Subject to any disclaimer, the term of this patent is extended or adjusted under 35 U.S.C. 154(b) by 0 days.

(21) Appl. No.: 18/623,959

(22) Filed: Apr. 1, 2024

Related U.S. Application Data

(63) Continuation-in-part of application No. 18/123,110, filed on Mar. 17, 2023, now Pat. No. 11,948,560, (Continued)

(51) Int. Cl.
*G06F 40/58* (2020.01)
*G06F 16/903* (2019.01)
(Continued)

(52) U.S. Cl.
CPC ........ *G06F 40/58* (2020.01); *G06F 16/90335* (2019.01); *G06F 40/284* (2020.01); *G06F 40/35* (2020.01)

(58) Field of Classification Search
None
See application file for complete search history.

(56) References Cited

U.S. PATENT DOCUMENTS 7,113,848 B2    9/2006  Hanson
7,809,548 B2   10/2010  Mihalcea et al.
(Continued)

FOREIGN PATENT DOCUMENTS

WO    2018081833 A1    5/2018

OTHER PUBLICATIONS

Abstract Meaning Representation (AMR)-Home; URL: https://amr.isi.edu/index.html (1 page), Apr. 1, 2024.
(Continued)

*Primary Examiner* — Quynh H Nguyen
(74) *Attorney, Agent, or Firm* — David W. Carstens; James H. Ortega; Carstens, Allen & Gourley, LLP

(57) ABSTRACT

A novel method provides an AI language virtual agent having self-improvement features and which uses language modeling and tree search techniques. The AI language virtual agent exchanges textual discussion with users and other simulated agents. The method includes receiving a current situational description depicting natural language user input, temperament qualities and textual tendencies of the virtual agent, and indicia regarding subject matter context of a present conversation. The indicia regarding subject matter context include textual logs from recent conversational exchanges. The current situational description includes audio, visual, and tactile inputs collected proximate to the virtual agent. The method preferably utilizes an MCTS tree search in combination with self-moving modules, one or more language models, tree search techniques outputting textual responses to the current situation description, and the virtual agent responding with textual expression to verbal input in combination with the audio, visual, tactile, and other sensory inputs.

20 Claims, 17 Drawing Sheets

Related U.S. Application Data which is a continuation-in-part of application No. 17/093,608, filed on Nov. 9, 2020, now Pat. No. 11,645,479.

(60) Provisional application No. 62/931,815, filed on Nov. 7, 2019.

(51) Int. Cl.
    *G06F 40/284*     (2020.01)
    *G06F 40/35*     (2020.01)

(56) References Cited

U.S. PATENT DOCUMENTS

| | | | |
|---|---|---|---|
| 8,346,534 | B2 | 1/2013 | Csomai et al. |
| 8,818,926 | B2 | 8/2014 | Wallace |
| 9,047,423 | B2 | 6/2015 | Tesauro et al. |
| 9,141,600 | B2 | 9/2015 | Tromp |
| 9,796,095 | B1 | 10/2017 | Hanson et al. |
| 10,008,196 | B2 | 6/2018 | Maisonnier et al. |
| 10,157,342 | B1 | 12/2018 | Kim |
| 10,272,349 | B2 | 4/2019 | Davenport |
| 10,621,648 | B2 | 4/2020 | Davis |
| 10,664,741 | B2 | 5/2020 | Gibbs et al. |
| 2017/0125008 | A1 | 5/2017 | Maisonnier et al. |
| 2018/0052664 | A1* | 2/2018 | Zhang ................ G06N 5/04 |
| 2019/0381415 | A1 | 12/2019 | McMullen et al. |
| 2020/0065868 | A1 | 2/2020 | Garlapati et al. |
| 2020/0147808 | A1 | 5/2020 | Pirzchalski et al. |
| 2020/0234243 | A1 | 7/2020 | Miron et al. |
| 2020/0258120 | A1 | 8/2020 | Ardulov et al. |
| 2020/0320978 | A1* | 10/2020 | Chatterjee ........ G10L 15/1822 |

OTHER PUBLICATIONS

Abstract Meaning Representation (AMR)-Research; URL: https://amr.isi.edu/research.html (3 pages), Apr. 1, 2024.

Alammar, Jay, "The Illustrated GPT-2 (Visualizing Transformer Language Models)" Visualizing machine learning one concept at a time; URL: http//jalammar.github.io/illustrated-gpt2/ (13 pages), Apr. 1, 2024.

Alammar, Jay, "The Illustrated BERT, ELMo, and co. (How NLP Cracked Transfer Learning)" (2018); URL: http://jalammar.github.io/illustrated-bert/ (20 pages).

Boinc Compute for Science, University of California; URL: https://boinc.berkeley.edu/ (1 page), Apr. 1, 2024.

Bourse, Yoann, "Artificial Intelligence in the Sims Series"; URL: https://team.inria.fr/imagine/files/2014/10/sims-slides.pdf (44 pages).

Brown, Tom B., et al.; "Language models are few-shot learners," arXiv preprint arXiv:2005.14165 (2020); URL: https://arxiv.org/pdf/2005.14165 and URL: https://github.com/openai/gpt-3 (74 pages).

Browne, Cameron B., et al., "A Survey of Monte Carlo Tree Search Methods", IEEE Transactions on Computational Intelligence and AI in Games, vol. 4, No. 1, Mar. 2012 (Mar. 1, 2012) pp. 1-43 (49 pages).

Chan, David, "The philosophy of The Sims," Stanford University Working paper; http://library.stanford.edu/depts/hasrg/histsci/STS145papers/Chan.pdf (2003); URL: https://web.stanford.edu/group/htgg/cgi-bin/drupal/sites/default/files2/dchan_2003_1.pdf (12 pages).

Clark, Peter, et al., "Transformers as Soft Reasoners over Language." ArXiv abs/2002.05867 (2020) n. pag. (15 pages).

CloudTurbine Stream Sharing; URL: https://www.cloudturbine.com/ (3 pages), Apr. 1, 2024.

Coursey, K. (2020) Speaking with Harmony: Finding the right thing to do or say . . . while in bed (or anywhere else). In O. Bendel (Ed.), Maschinenliebe: Teil 1 Liebespuppen und Sexroboter aus technischer, psychologischer und philosophischer Perspektive. Wiesbaden: Springer Gabler (17 pages).

Coursey, K. (2020) Speaking with Harmony: Finding the right thing to do or say . . . while in bed (or anywhere else). In O. Bendel (Ed.), Maschinenliebe: Teil 3 Liebespuppen und Sexroboter aus technischer, psychologischer und philosophischer Perspektive (pp. 1-12). Wiesbaden: Springer Gabler (12 pages).

Coursey, K., et al. (2019) "Living with Harmony: A Personal Companion System by Realbotix™." In: Zhou Y., Fischer MH (eds) AI Love You. Springer, Cham, pp. 77-95; URL: https://www.daxtron.com/pdf/Coursey%20et%20al.%20Living%20with%20Harmony%20AI+Love+You.pdf (36 pages).

Coursey, Kino High, "The Value of Everything: Ranking and Association with Encyclopedic Knowledge," University of North Texas (2009); URL: https://digital.library.unt.edu/ark:/67531/metadc12108/m2/1/high_res_d/dissertation.pdf (191 pages).

Csomai, A. (2008) "Keywords in the mist: Automated keyword extraction for very large documents and back of the book indexing," Ph.D. thesis, University of North Texas, United States—Texas; URL: https://digital.library.unt.edu/ark:/67531/metadc6118/m2/1/high_res_d/dissertation.pdf (145 pages).

Csomai, A. and Mihalcea, R. (2008) "Linking Documents to Encyclopedic Knowledge," IEEE Intelligent Systems 23(5), 34-41; URL: http://www.academia.edu/download/8026958/mex2008050034.pdf (8 pages).

Devlin, J. et al., "Bert: Pre-training of deep bidirectional transformers for language understanding"—arXiv preprint arXiv . . . , (2018) arxiv.org; URL: https://arxiv.org/pdf/1810.04805.pdf (16 pages).

FightAIDS@home, "Go to battle against AIDS with your computer!" URL: http://fightaidsathome.scripps.edu/ (3 pages), Apr. 1, 2024.

Folding@Home; URL: https://foldingathome.org/2019/03/?Ing=en-US (1 page), Apr. 1, 2024.

Gao, Jianfeng, et al., "Neural Approaches to Conversational AI", SIGIR (2018); URL: https://www.microsoft.com/en-us/research/uploads/prod/2018/07/neural-approaches-to-conversational-AI.pdf (175 pages).

GPT-2 Neural Network Poetry; gwern.net; URL: https://www.gwern.net/GPT-2 (88 pages), Apr. 1, 2024

Grand, Stephen and Dave Cliff, "Creatures: Entertainment Software Agents with Artificial Life," Autonomous Agents and Multi-Agent Systems, 100, 1-20 (1997); URL: https://www.researchgate.net/publication/226997131 (22 pages).

Grand, Steve, "Creation: Life and How to Make It" (2000) (173 pages).

Grand, Steve, "Growing Up With Lucy: How to Build An Android in Twenty Easy Steps," (2003) (214 pages).

Grand, Steve, et al., "Creatures: Artificial Life Autonomous Software Agents for Home Entertainment," Millennium Technical Report 9601, University of Sussex Technical Report CSRP434 (1997) (9 pages).

Grand, Steven and Dave Cliff, "Creatures: Entertainment Software Agents with Artificial Life," Autonomous Agents and Multi-Agent Systems, 100, 1-20 (1997) URL: https://www.researchgate.net/publication/220794226_Creatures_Artificial_Life_Autonomous_Software_Agents_for_Home_Entertainment; Fall 2005 (14 pages).

Graziano, M.S.A., Webb, T.W. (2017) "From Sponge to Human: The Evolution of Consciousness" (PDF). Evolution of Nervous Systems, 2E. vol. 3, pp. 547-554. doi:10.1016/B978-0-12-804042-3.00098-1. ISBN 9780128040966; URL: http://www.elsevier.com/locate/permissionusematerial (9 pages), Apr. 1, 2024.

Graziano, Michael and Taylor Webb, "Part Three, Metaphilosophy of Consciousness Studies, Understanding Consciousness by Building It," The Bloomsbury Companion to the Philosophy of Consciousness, (2018) 185-210 (26 pages).

Graziano, Msa (2017) "The Attention Scheme Theory: A Foundation for Engineering Artificial Consciousness," Frontiers In Robotics and AI 4:60. doi: 10.3389/frobt.2017.00060 (2017) (9 pages).

Haase, K. W. (1990) "Invention and Exploration in Discovery," (Doctoral dissertation, Massachusetts Institute of Technology);URL: https://dspace.mit.edu/bitstream/handle/1721.1/14257/22713693-MIT.pdf?sequence=2 (165 pages).

Hopkins, Don, "The Sims Design Document" v.71 "The Sims Design Document Draft 7" (Oct. 2, 1998) URL: https://donhopkins.com/home/TheSims/TheSimsDesignDocumentDraft7-1998-10-02-DonsReview.pdf; Assoc URL: http://linkedbyair.net/bin/The%20Sims%20Design%20Documents/ (51 pages).

(56) References Cited

OTHER PUBLICATIONS

Horev, Rani, "BERT Explained: State of the art language model for NLP" (2018); URL: https://towardsdatascience.com/bert-explained-state-of-the-art-language-model-for-nlp-f8b21a9b6270 (8 pages).
How to Train It, Issue #19, GitHub, Feb. 15, 2019; URL: https://github.com/openai/gpt-2/issues/19 (6 pages).
Hutto, Clayton J. and Eric Gilbert, "Vader: A Parsimonious Rule-Based Model for Sentiment Analysis of Social Media Text." Eighth International Conference on Weblogs and Social Media (ICWSM-14) Jun. 2014 (10 pages).
Install TensorFlow 2; URL: https://www.tensorflow.org/install (1 page), Apr. 1, 2024.
Install TensorFlow with pip; URL: https://www.tensorflow.org/install/pip (3 pages), Apr. 1, 2024.
Kocsis, Levente, et al., "Bandit based Monte-Carlo Planning" (2006); In Fürnkranz, Johannes; Scheffer, Tobias; Spiliopoulou, Myra (eds.). Machine Learning: ECML 2006, 17th European Conference on Machine Learning, Berlin, Germany (Sep. 18-22, 2006), Proceedings. Lecture Notes in Computer Science. 4212. Springer. pp. 282-293. CiteSeerX 10.1.1.102.1296. doi:10.1007/11871842_29. ISBN 3-540-45375-X; URL: https://citeseerx.ist.psu.edu/viewdoc/summary?doi=10.1.1.102.1296 (12 pages).
Lee, Jieh-Sheng and Hsiang, Jieh, "Patent Claim Generation by Fine-Tuning OpenAI GPT-2." arXiv preprint arXiv:1907.02052 (2019); National Taiwan University; URL: https://arxiv.org/pdf/1907.02052 (11 pages).
Lenat, Douglas (1983) "Eurisko: A program that learns new heuristics and domain concepts," Artificial Intelligence 21 (1-2): 61-98, doi:10.1016/s0004-3702(83)80005-8 (39 pages).
Lenat, Douglas and Brown, J.S. (1984) "Why AM and Eurisko appear to work" (PDF), ResearchGate: 269-240; URL: https://www.researchgate.net/publication/221605660_Why_AM_and_Eurisko_Appear_to_Work (6 pages).
Lenat, Douglas B., "The Nature of Heuristics," Artiicial Intelligence 19 (1982) 189-249 (61 pages).
Lenat, Douglas B., "Theory Formation by Heuristic Search," Artificial Intelligence 21 (1983) 31-59 (29 pages).
Lenat, Douglas, "Eurisko: A program that learns new heuristics and domain concepts," Artificial Intelligence 21 (1983) 61-98, doi: 10.1016/s0004-3702(83)80005-8 (38 pages).
Lenat, Douglas; Brown, JS (1984) "Why AM and Eurisko Appear to Work," Artificial Intelligence 23(3), 269-294. https://doi.org/10.1016/0004-3702(84)90016-X (26 pages).
Mcts 1.0.4; URL: https://pypi.org/project/mcts/ (1 page), Apr. 1, 2024.
Microsoft_AI_Vector_search; URL: https://www.microsoft.com/en-us/ai/ai-lab-vector-search (4 pages), Apr. 1, 2024.
Mihalcea, Rada and Csomai, Andras, "Wikify! Linking documents to encyclopedic knowledge," In Proceedings of the sixteenth ACM conference on Conference on information and knowledge management, pp. 233-242. 2007; URL: http://web.eecs.umich.edu/~mihalcea/papers/mihalcea.cikm07.pdf (9 pages).
Mihalcea, Rada and Tarau, Paul (2004) TextRank: "Bringing Order into Texts," Department of Computer Science University of North Texas "Archived copy" (PDF). Archived from the original (PDF) on Jun. 17, 2012. Retrieved Jul. 20, 2012; URL: https://web.archive.org/web/20120617170501/http:/acl.ldc.upenn.edu/acl2004/emnlp/pdf/Mihalcea.pdf (8 pages).
Monte Carlo tree search—Wikipedia; last edit Jun. 10, 2020; URL: https://en.wikipedia.org/wiki/Monte_Carlo_tree_search (10 pages).
01_Source_Code_GitClone_AI-DungeonMaster_1-100, Apr. 1, 2024.
02_Source_Code_GitClone_AI-DungeonMaster_101-781, Apr. 1, 2024.
03_Source_Code_GitClone_ann-benchmarks_292, Apr. 1, 2024.
04_Source_Code_GitClone_annoy_1-600, Apr. 1, 2024.
05_Source_Code_GitClone_annoy_601-1105, Apr. 1, 2024.
06_Source_Code_GitClone_cdQA_2384, Apr. 1, 2024.
07_Source_Code_GitClone_cloudturbine_1-3000, Apr. 1, 2024.
08_Source_Code_GitClone_cloudturbine_3001-6000, Apr. 1, 2024.
09_Source_Code_GitClone_cloudturbine_6001-9000, Apr. 1, 2024.
10_Source_Code_GitClone_cloudturbine_9001-12000, Apr. 1, 2024.
100_Source_Code_GitClone_vaderSentiment_751-1412, Apr. 1, 2024.
101_Source_Code_GitClone_Zeta36_1-10, Apr. 1, 2024.
102_Source_Code_GitClone_Zeta36_11-131, Apr. 1, 2024.
11_Source_Code_GitClone_cloudturbine_12001-15000, Apr. 1, 2024.
12_Source_Code_GitClone_cloudturbine_15001-18000, Apr. 1, 2024.
13_Source_Code_GitClone_cloudturbine_18001-21000, Apr. 1, 2024.
14_Source_Code_GitClone_cloudturbine_21001-24000, Apr. 1, 2024.
15_Source_Code_GitClone_cloudturbine_24001-27000, Apr. 1, 2024.
16_Source_Code_GitClone_cloudturbine_27001-30000, Apr. 1, 2024.
17_Source_Code_GitClone_cloudturbine_30001-33000, Apr. 1, 2024.
18_Source_Code_GitClone_cloudturbine_33001-36000, Apr. 1, 2024.
19_Source_Code_GitClone_cloudturbine_36001-39000, Apr. 1, 2024.
20_Source_Code_GitClone_cloudturbine_39001-42000, Apr. 1, 2024.
21_Source_Code_GitClone_cloudturbine_42001-45000, Apr. 1, 2024.
22_Source_Code_GitClone_cloudturbine_45001-48000, Apr. 1, 2024.
23_Source_Code_GitClone_cloudturbine_48001-51000, Apr. 1, 2024.
24_Source_Code_GitClone_cloudturbine_51001-54000, Apr. 1, 2024.
25_Source_Code_GitClone_cloudturbine_54001-57000, Apr. 1, 2024.
26_Source_Code_GitClone_cloudturbine_57001-60000, Apr. 1, 2024.
27_Source_Code_GitClone_cloudturbine_60001-63000, Apr. 1, 2024.
28_Source_Code_GitClone_cloudturbine_63001-66000, Apr. 1, 2024.
29_Source_Code_GitClone_cloudturbine_66001-66882, Apr. 1, 2024.
30_Source_Code_GitClone_fast-bert_1-3000, Apr. 1, 2024.
31_Source_Code_GitClone_fast-bert_3001-4587, Apr. 1, 2024.
32_Source_Code_GitClone_Fine-tune_7, Apr. 1, 2024.
33_Source_Code_GitClone_FreeSims_1-700, Apr. 1, 2024.
34_Source_Code_GitClone_FreeSims_701-2800, Apr. 1, 2024.
35_Source_Code_GitClone_FreeSims_2801_6300, Apr. 1, 2024.
36_Source_Code_GitClone_FreeSims_6301-9100, Apr. 1, 2024.
37_Source_Code_GitClone_FreeSims_9101-11900, Apr. 1, 2024.
38_Source_Code_GitClone_FreeSims_11901-14000, Apr. 1, 2024.
39_Source_Code_GitClone_FreeSims_14001-15400, Apr. 1, 2024.
40_Source_Code_GitClone_FreeSims_15401-17500, Apr. 1, 2024.
41_Source_Code_GitClone_FreeSims_17501-18417, Apr. 1, 2024.
42_Source_Code_GitClone_GitClone_AI-DungeonMaster_1-300, Apr. 1, 2024.
43_Source_Code_GitClone_GitClone_AI-DungeonMaster_301-781, Apr. 1, 2024.
44_Source_Code_GitClone_gpt-2_1-200, Apr. 1, 2024.
45_Source_Code_GitClone_gpt-2_201-400, Apr. 1, 2024.
46_Source_Code_GitClone_gpt-2_401-600, Apr. 1, 2024.
47_Source_Code_GitClone_gpt-2_601-800, Apr. 1, 2024.
98_Source_Code_GitClone_trainLMS_pub_9, Apr. 1, 2024.
99_Source_Code_GitClone_vaderSentiment_1-750, Apr. 1, 2024.
48_Source_Code_GitClone_gpt-2_801-1000, Apr. 1, 2024.
49_Source_Code_GitClone_gpt-2_1001-1200, Apr. 1, 2024.
50_Source_Code_GitClone_gpt-2_1201-1305, Apr. 1, 2024.
51_Source_Code_GitClone_gpt-2-simple_1-200, Apr. 1, 2024.
52_Source_Code_GitClone_gpt-2-simple_201-400, Apr. 1, 2024.
53_Source_Code_GitClone_gpt-2-simple_401-600, Apr. 1, 2024.
54_Source_Code_GitClone_gpt-2-simple_601-800, Apr. 1, 2024.
55_Source_Code_GitClone_gpt-2-simple_801-1000, Apr. 1, 2024.
56_Source_Code_GitClone_gpt-2-simple_1001-1200, Apr. 1, 2024.
57_Source_Code_GitClone_gpt-2-simple_1201-1440, Apr. 1, 2024.
58_Source_Code_GitClone_gpt-3_1-500, Apr. 1, 2024.
59_Source_Code_GitClone_gpt-3_501-1000, Apr. 1, 2024.
60_Source_Code_GitClone_gpt-3_1001-1500, Apr. 1, 2024.
61_Source_Code_GitClone_gpt-3_1501-2000, Apr. 1, 2024.
62_Source_Code_GitClone_gpt-3_2001-2500, Apr. 1, 2024.
63_Source_Code_GitClone_gpt-3_2501-3539, Apr. 1, 2024.
64_Source_Code_GitClone_johan-gras_136, Apr. 1, 2024.
65_Source_Code_GitClone_MCTS_1-50, Apr. 1, 2024.
66_Source_Code_GitClone_MCTS_51-98, Apr. 1, 2024.
67_Source_Code_GitClone_milvus_1-700, Apr. 1, 2024.
68_Source_Code_GitClone_milvus_701-2100, Apr. 1, 2024.
69_Source_Code_GitClone_milvus_2101-3500, Apr. 1, 2024.
70_Source_Code_GitClone_milvus_3501-4200, Apr. 1, 2024.
71_Source_Code_GitClone_milvus_4201-4900, Apr. 1, 2024.
72_Source_Code_GitClone_milvus_4901-5600, Apr. 1, 2024.
73_Source_Code_GitClone_milvus_5601-6300, Apr. 1, 2024.
74_Source_Code_GitClone_milvus_6301-6848, Apr. 1, 2024.
75_Source_Code_GitClone_muzero-general_1-1600, Apr. 1, 2024.

(56) References Cited

OTHER PUBLICATIONS

76_Source_Code_GitClone_muzero-general_1601-1983, Apr. 1, 2024.
77_Source_Code_GitClone_muzero-pytorch_556, Apr. 1, 2024.
78_Source_Code_GitClone_pynndescent_1-400, Apr. 1, 2024.
79_Source_Code_GitClone_pynndescent_401-800, Apr. 1, 2024.
80_Source_Code_GitClone_python-tf-idf_114, Apr. 1, 2024.
81_Source_Code_GitClone_ReDial_A19_1-1000, Apr. 1, 2024.
82_Source_Code_GitClone_ReDial_A19_1001-3000, Apr. 1, 2024.
83_Source_Code_GitClone_ReDial_A19_3001-5000, Apr. 1, 2024.
84_Source_Code_GitClone_ReDial_A19_5001-7000, Apr. 1, 2024.
85_Source_Code_GitClone_ReDial_A19_7001-7585, Apr. 1, 2024.
86_Source_Code_GitClone_ReducedFreeSims_1-600, Apr. 1, 2024.
87_Source_Code_GitClone_ReducedFreeSims_601-1200, Apr. 1, 2024.
88_Source_Code_GitClone_ReducedFreeSims_1201-4800, Apr. 1, 2024.
89_Source_Code_GitClone_ReducedFreeSims_4801-8400, Apr. 1, 2024.
90_Source_Code_GitClone_ReducedFreeSims_8401-10800, Apr. 1, 2024.
91_Source_Code_GitClone_ReducedFreeSims_10801-12600, Apr. 1, 2024.
92_Source_Code_GitClone_ReducedFreeSims_12601-13800, Apr. 1, 2024.
93_Source_Code_GitClone_ReducedFreeSims_13801-15600, Apr. 1, 2024.
94_Source_Code_GitClone_ReducedFreeSims_15601-16800, Apr. 1, 2024.
95_Source_Code_GitClone_ReducedFreeSims_16801-17717, Apr. 1, 2024.
96_Source_Code_GitClone_SPTAG_561, Apr. 1, 2024.
97_Source_Code_GitClone_textrank_251, Apr. 1, 2024.
Monte-Carlo Tree Search—Chessprogramming wiki; last edit May 15, 2020; URL: https://www.chessprogramming.org/Monte-Carlo_Tree-Search (17 pages).
Oresky, Colleen M., et al. (1991). Strategic automatic discovery system (STRADS). 4. 223-260. 10.1007/978-1-4612-3040-3_11; Reprinted from "Knowledge-Based Simulation: Methodology and Application" (38 pages).
Orkin, J., "Goal-Oriented Action Planning (GOAP)", MIT Media Lab, URL: http://alumni.media.mit.edu/~jorkin/goap.html (2 pages), Apr. 1, 2024.
Orkin, Jeff, "Applying Goal-Oriented Action Planning to Games," (2008) URL: http://alumni.media.mit.edu/~jorkin/GOAP_draft_AIWisdom2_2003.pdf (11 pages).
Radford, Alec et al., "Better Language Models and Their Implications," openai.com.pdg; (2019) URL:https://openai.com/blog/better-language-models/; (1 page).
Radford, Alec, et al., "Language Models are Unsupervised Multitask Learners" (2019) URL: https://d4mucfpksywv.cloudfront.net/better-language-models/language_models_are_unsupervised_multitask_learners.pdf (24 pages).
Replika: Building an Emotional Conversation with Deep Learning; URL: https://scai.info/slides/replika_ai.pdf (26 pages), Apr. 1, 2024.
Schrittwieser, Julian, et al., "Mastering Atari, Go, Chess and Shogi by Planning with a Learned Model," arXiv:1911.08265v2 [cs.LG] (2020), (21 pages).
Seth, Yashu, "BERT Explained—A list of Frequently Asked Questions" (2019) URL: https://yashuseth.blog/2019/06/12/bert-explained-faqs-understand-bert-working/ (8 pages).
Shum, Heung-Yeung, et al., "From Eliza to Xiaolce: Challenges and Opportunities with Social Chatbots," Frontiers of Information Technology & Electronic Engineering 19, No. 1 (2018): 10-26; URL: https://arxiv.org/ftp/arxiv/papers/1801/1801.01957.pdf (20 pages).
Silver, David, et al., "Mastering Chess and Shogi by Self-Play with a General Reinforcement Learning Algorithm" arXiv:1712.01815 [cs.AI] (Dec. 5, 2017) URL: https://arxiv.org/pdf/1712.01815 (19 pages).
Silver, David, et al.; "A general reinforcement learning algorithm that masters chess, shogi, and go through self-play" Science. 362 (6419); 1140-1144. doi:10.1126/science.aar6404. Retrieved Dec. 7, 2018; URL: https://science.sciencemag.org/content/sci/362/6419/1140.full.pdf (6 pages).
Sturtevant, Nathan, "Monte-Carlo Tree Search and Related Algorithms for Games", Game AI Pro 2: Collected Wisdom of Game AI Professionals; URL: http://www.gameaipro.com/GameAIPro2/GameAIPro2_Chapter25_Monte_Carlo_Tree_Search_and_Related_Algorithms_for_Games.pdf (17 pages), Apr. 1, 2024.
Summa 1.2.0; URL: https://pypi.org/project/summa/ (2 pages), Apr. 1, 2024.
The Sims Video Games—Official EA Site; URL: https://www.ea.com/games/the-sims (2 pages), Apr. 1, 2024.
The Sims, Wikipedia; URL: https://en.wikipedia.org/wiki/The_Sims (7 pages), Apr. 1, 2024.
Transformers as Soft Reasoners over Language, AI2 Allen Institute for AI; URL: https://rule-reasoning.apps.allenai.org/ about (1 page), Apr. 1, 2024.
UCT—Chessprogramming wiki; last edit May 15, 2020; URL: https://www.chessprogramming.org/UCT (8 pages).
VaderSentiment 3.3.2; PyPI.org screenshot; URL: https://pypi.org/project/vaderSentiment/ (1 page), Apr. 1, 2024.
Veness, Joel et al.; "A Monte-Carlo AIXI Approximation," Journal of Artificial Intelligence Research 40: 95-142 (2011); URL: https://www.jair.org/index.php/jair/article/view/10685 (48 pages).
Veness, Joel, et al., "A Monte Carlo AIXI Approximation," e-print arXiv:0909.0801 (2009); URL: https://arxiv.org/abs/0909.0801 (51 pages).
Vincent, James "DeepMind's AI became a superhuman chess player in a few hours, just for fun," The Verge; (Dec. 6, 2017); URL: https://www.theverge.com/2017/12/6/16741106/deepmind-ai-chess-alphazero-shogi-go (4 pages).
Wallace, Dr. Richard S. "The Elements of AIML Style," Alice A. I. Foundation, Inc. (2003) URL: https://files.ifi.uzh.ch/cl/hess/classes/seminare/chatbots/style.pdf (86 pages).
Webb TW, Graziano MS (2015) "The attention schema theory: a mechanistic account of subjective awareness," Front Psychol. 6:500. doi:10.3389/fpsyg.2015.00500. PMC 4407481. PMID 25954242 (11 pages).
Xiaoice_Wikipedia, last edited Apr. 17, 2020, URL: https://en.wikipedia.org/wiki/Xiaoice (2 pages).
Zhou, Li, et al., "The Design and Implementation of Xiaoice, an Empathetic Social Chatbot," Computational Linguistics 46, No. 1 (2020); 53-93; URL: https://arxiv.org/pdf/1812.08989.pdf (35 pages).

\* cited by examiner

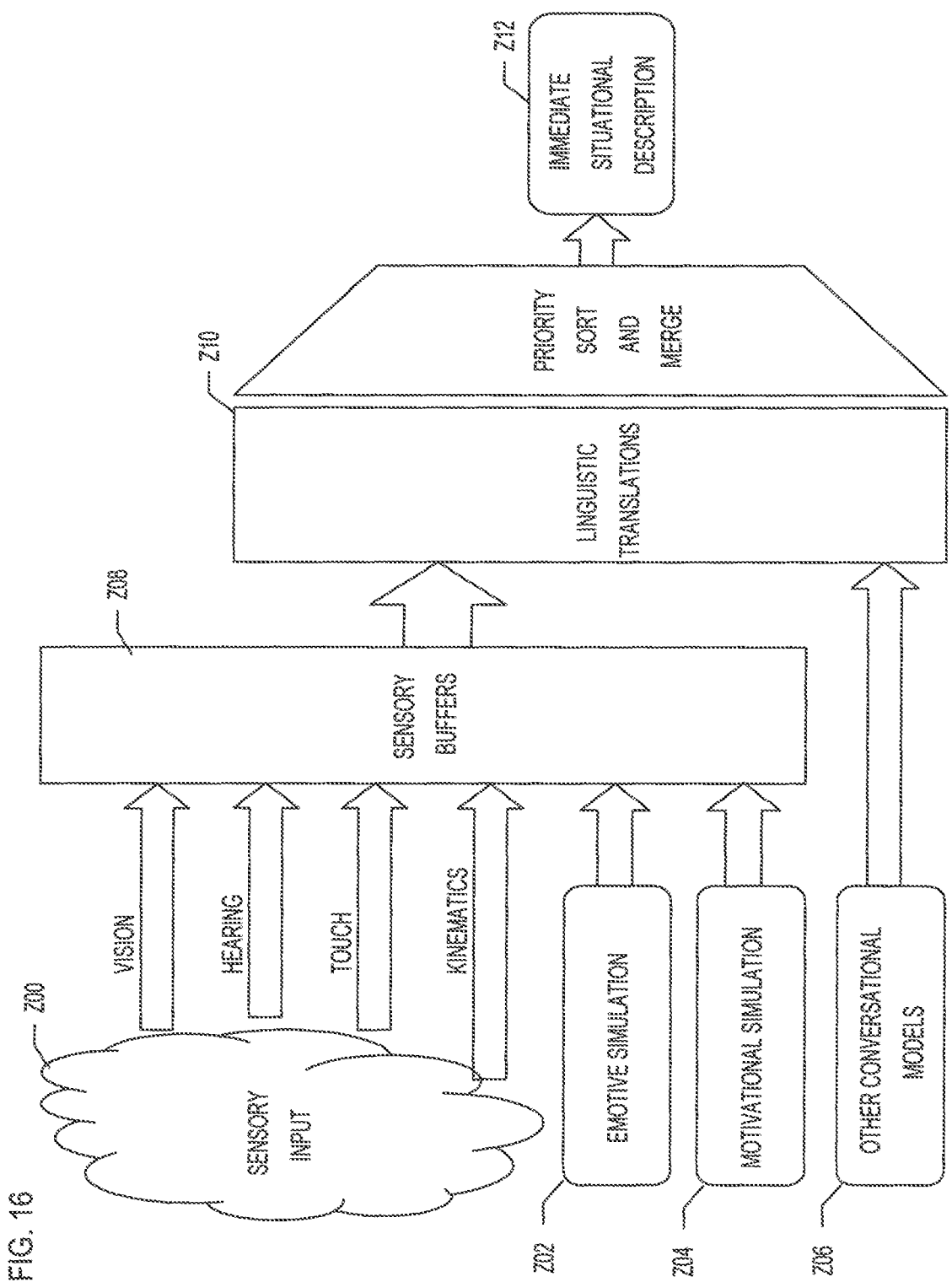

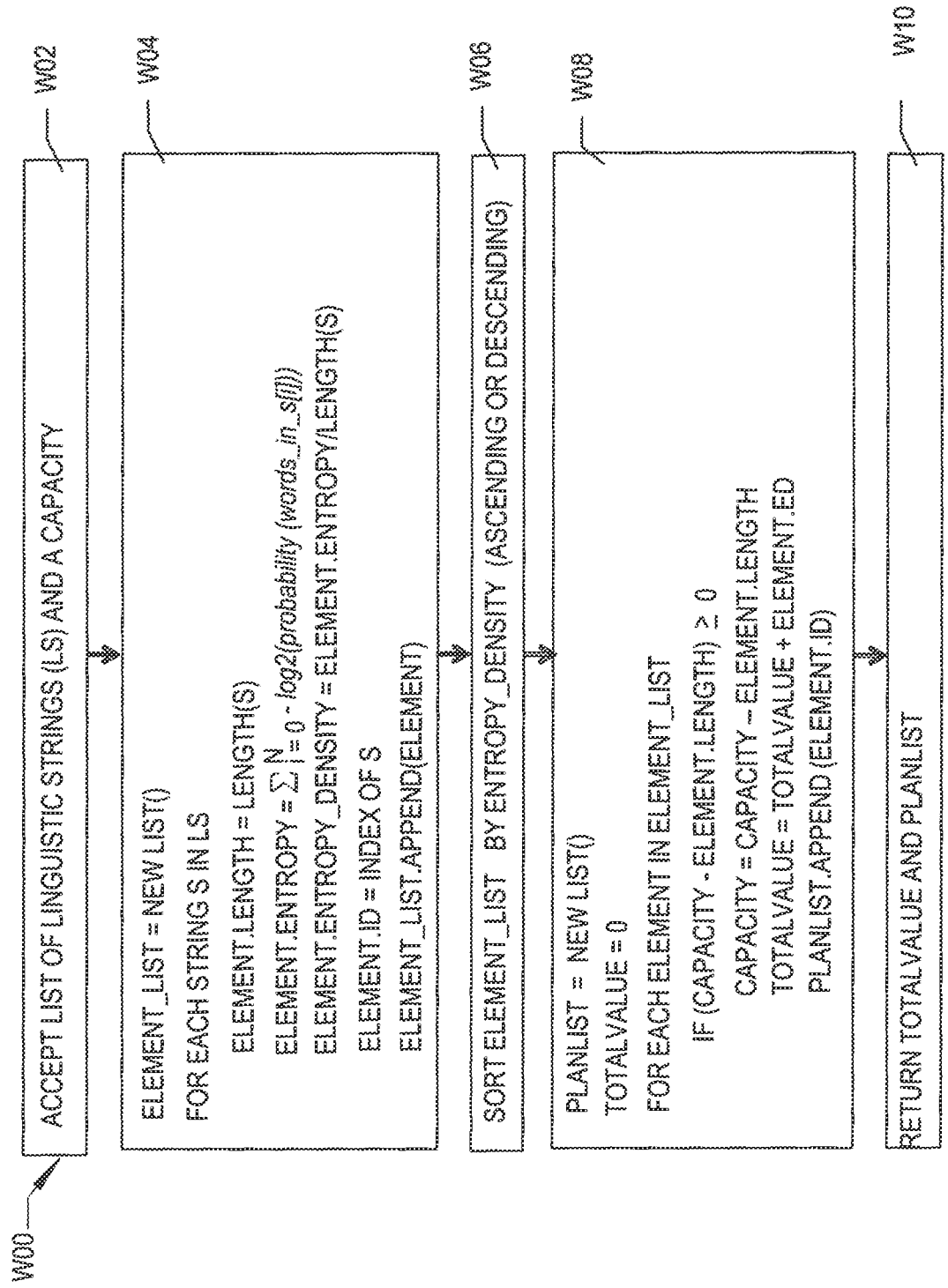

METHOD FOR AI LANGUAGE SELF-IMPROVEMENT AGENT USING LANGUAGE MODELING AND TREE SEARCH TECHNIQUES

REFERENCE TO RELATED APPLICATION

The present application is a continuation-in-part of U.S. Nonprovisional patent application Ser. No. 18/123,110 filed Mar. 17, 2023, entitled "Method for AI Language Self-Improvement Agent Using Language Modeling and Tree Search Techniques," which is a continuation-in-part of U.S. Nonprovisional patent application Ser. No. 17/093,608 filed Nov. 9, 2020, entitled "Method for AI Language Self-Improvement Agent Using Language Modeling and Tree Search Techniques," issued as U.S. Pat. No. 11,645,479 on May 9, 2023, which claims benefit of U.S. Provisional Patent Application No. 62/931,815, filed Nov. 7, 2019, entitled "A Practical Method for Creating a Self-Improving Agent Using Language Modeling and Tree Search," invented by Kino High Coursey, and claims priority to the applications and incorporates applications in their entirety for all purposes.

TECHNICAL FIELD OF THE INVENTION

The present invention relates to artificial intelligence in language applications and in particular to machines programed to use artificial intelligence to simulate agents for interacting and communicating with humans.

BACKGROUND OF THE INVENTION

Prior art speech recognition and speech synthesis computing has been provided by recognizing and responding to a list of predetermined prompts. Speech generated in response to speech recognition under various situations is substantially more complex than speech generated in response to the predetermined prompts. In the field of language generation, language models trained on large databases, such as OpenAI GPT-2 and GPT-3 have produced near human quality output. In other fields such as AI board games, tree search-based playing of board games has resulted in systems such as AlphaZero developing high performance in a mostly self-taught manner through repeated self-play and logging of self-play games. Logging of self-play games creates self-play logs which are later used for tree search queries and predicting expected outcomes of various game moves in selecting the moves having the highest probability of game success. The prior art has not provided a highly successful virtual agent for language interactions which utilizes self-play learning to generate conversation logs from tree search processes in determining language utterances.

SUMMARY OF THE INVENTION

A novel method for AI language self-improvement agent using language modeling and tree search techniques is disclosed for a virtual agent exchanging textual discussion with users and other simulated virtual agents. The method includes the steps of receiving a current situational description, wherein the current situational description includes natural language user input, properties regarding the qualities of the virtual agent, and indicia regarding subject matter context of a present conversation. The qualities of the virtual agent include temperament and textual tendencies. The indicia regarding subject matter context include textual logs from recent conversational exchanges. The current situational description includes audio, visual, and tactile inputs collected proximate to the virtual agent. The method utilizes a database of one or more language models, conversation logs storing text from prior textual exchanges, and reference conversations utilized for training according to the one or more language models. The method is comprised of steps for executing instructions for a combination of self-play engines for training of the language model with self-play and external interaction engines for communicating with one or more external users or external virtual agents. The method further includes instructional sets for self-moving modules for advancing the method of external agents/users communicating with the virtual agent via a combination of textual exchanges and one or more audio, visual or tactile inputs into the virtual agent. The method preferably utilizes tree search processes, such as Monte Carlo Tree Search ("MCTS") processes, in combination with the one or more language models to provide the tree search techniques outputting textual responses to said current situation description, and wherein said virtual agent responds with textual expression to verbal input in combination with the audio, visual, tactile, and other sensory inputs.

A method is disclosed for embedding language models such as GPT-2 or GPT-3 within a tree search framework, allowing the benefits of both methods to be realized, and to provide additional benefits from their mutual interaction. The agent can select its utterance or action based on the projected expected outcome. The language model provides both "move generation" and "evaluation" functions for the search process. The search process simulates multiple viewpoints conducting a virtual conversation based on the language models used. The interaction between viewpoints is a deliberation process and is inspectable, allowing explanation of outcome. Self-play/Self-talk allows the system to generate self-play logs which are used to train future versions of the language model. Self-play logs are used to train the language models and "compile" overall system performance into the language model, improving both the move generation and evaluation process. Language models can generate many plausible responses, but can lack a way of selecting the "best" response versus the "most probable" response. The tree search process selects the "best" response leading to the highest average expected outcome based on sample-based projections of the future. Goal directed self-filtering is also provided in selecting appropriate choices.

DESCRIPTION OF THE DRAWINGS

For a more complete understanding of the present invention and the advantages thereof, reference is now made to the following description taken in conjunction with the accompanying Drawings in which FIGS. 1 through 17 show various aspects for a method for AI language self-improvement agent using language modeling and tree search techniques according to the present disclosure, as set forth below:

FIG. 1 is a flow chart depicting the method for AI language self-improvement agent using language modeling and tree search techniques according to the present disclosure;

FIG. 2 is a block diagram depicting the overall architecture of a system implementing the AI language methods according to the present disclosure;

FIG. 3 is a flow chart depicting a process for generating a contextual description;

FIG. 4 is a flow chart depicting an abstracted tree search process utilizing contextual descriptions;

FIG. 5 is a schematic diagram depicting different layers of a Monte Carlo Tree Search Process;

FIG. 6 is a flow chart depicting a move generation process using language models;

FIG. 7 is a flow chart depicting an evaluation process using language models;

FIG. 8 is a flow chart depicting steps for evaluation generation;

FIG. 9 is a flow chart depicting evaluation utilizing a basic sentiment analysis;

FIG. 10 is a flow chart depicting evaluation using goal oriented analysis;

FIG. 11 is a flow chart which depicts merging multiple analyses into a weighted evaluation;

FIG. 12 is a schematic diagram depicting an apparatus for self-learning through application of a self-play feedback loop;

FIG. 13 is a schematic diagram depicting an apparatus for interlocking training and self-play processes;

FIG. 14 is a schematic diagram depicting a design for an agent for generating linguistic responses to verbal and situational inputs;

FIG. 15 is a flow chart depicting a training process required for a broad coverage agent;

FIG. 16 is a schematic diagram for providing an informational funnel to construct Immediate Situational Descriptions; and FIG. 17 is a block diagram for generating and selecting content using entropy density and a fractional knapsack model.

DESCRIPTION OF THE INVENTION

Figure 1:
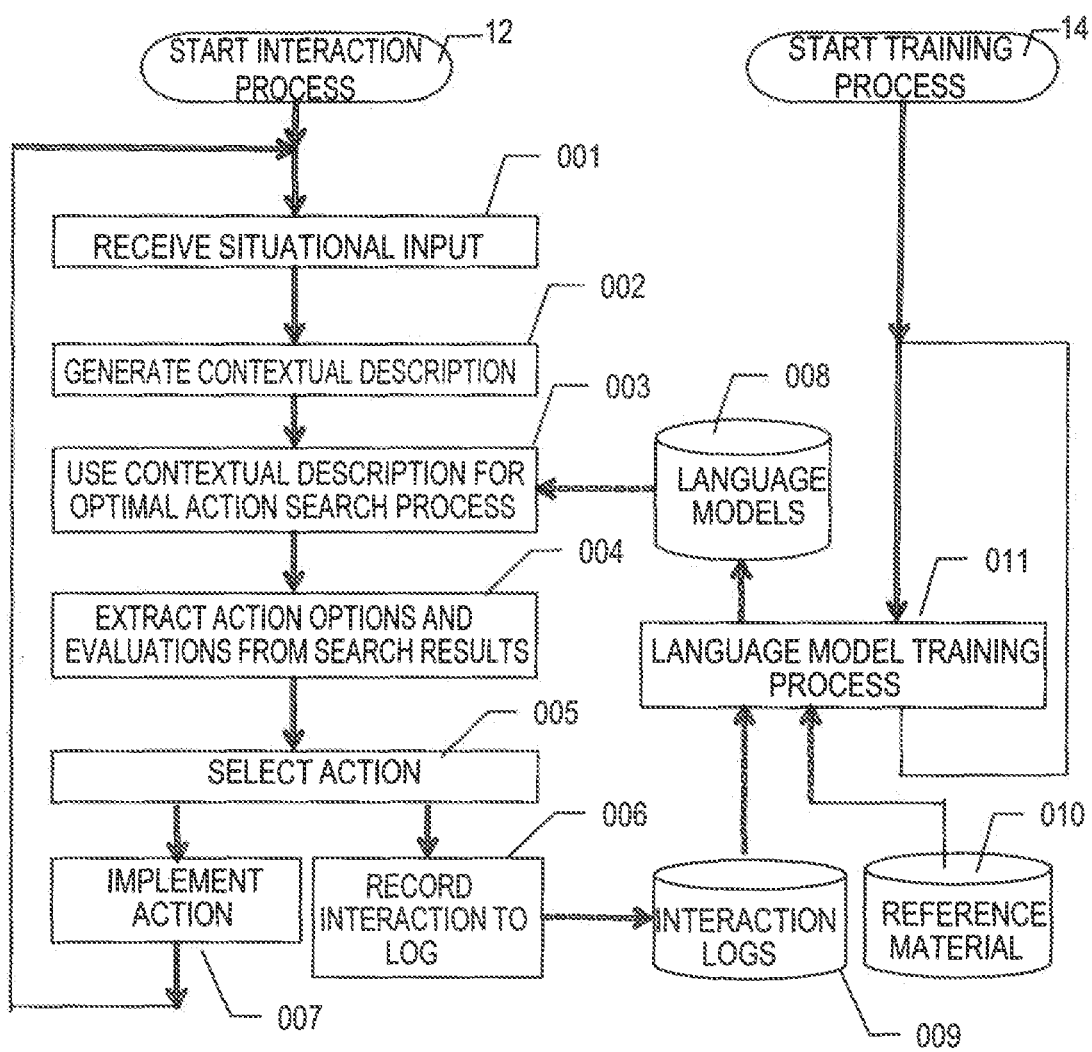

FIG. 1 is a flow chart depicting a method for an AI language self-improvement virtual agent using language modeling and tree search techniques. Two interlocking processes are shown that together implement a method for generating natural language output and initiating actions through a deliberative process and a method of improved operation through both supervised and unsupervised learning. The deliberative interaction process is started in Step 12 and receives situational input from either internal or external sources in Step 001. Such description may include user input expressed in natural language optionally combined with sensory or situational input expressed also in natural language. In Step 002, the situational input is merged with background information to create a contextual description. The goal of the contextual description is to provide a summary of all relevant information relevant to a deliberation process other than the immediate situational input. In Step 003, a deliberative search process uses the contextual description to produce a range of possible actions and to assign values to each possible action. This search process uses language models 008 to both produce plausible continuations and to provide evaluative information. The output of this process is a list of possible actions along with their score or value. The result of the search process 003 will produce a data structure that encodes the expected values of each possible action under consideration. In Step 004, the list of possible actions and their evaluations are extracted from the search data structure. In Step 005, the optimal action is extracted from the list of actions and their evaluations. Usually, this selects either the maximum or minimum action based on the evaluation used; however, other criteria may be used and the value of each action may be a multi-dimensional vector instead of a unitary value, in which case a weighted selection process may be employed. In some cases, the action selected may not be optimal from a numeric view but may be selected to meet some other criteria such as variety or behavioral loop prevention. In Step 007, the action selected in Step 005 is implemented through interpretation as either a user interaction, animation action or as a system internal action. The output of Step 007 becomes part of the history of an interactions log that is used to make up the immediate situational input of Step 001.

In Step 006, the situational input and optionally contextual description is recorded along with the selected output of Step 005 into an interaction log 009. The interaction log is used by the unsupervised learning process system in Step 011. Once initiated in Step 14, the language model training process 011 generates the language models 008 from reference material 010 used for supervised training and interaction logs 009 for unsupervised learning. Reference material 010 may be provided by manually selected material, by curated material, or by automated collection methods, such as topic focused collection, quality focused web collection, and text mining. During the search process in Step 003, numerous simulated interactions may be generated, and these simulated interactions may form additional training material for unsupervised learning of both generative and evaluative language models or classifiers used in the system.

Figure 2:
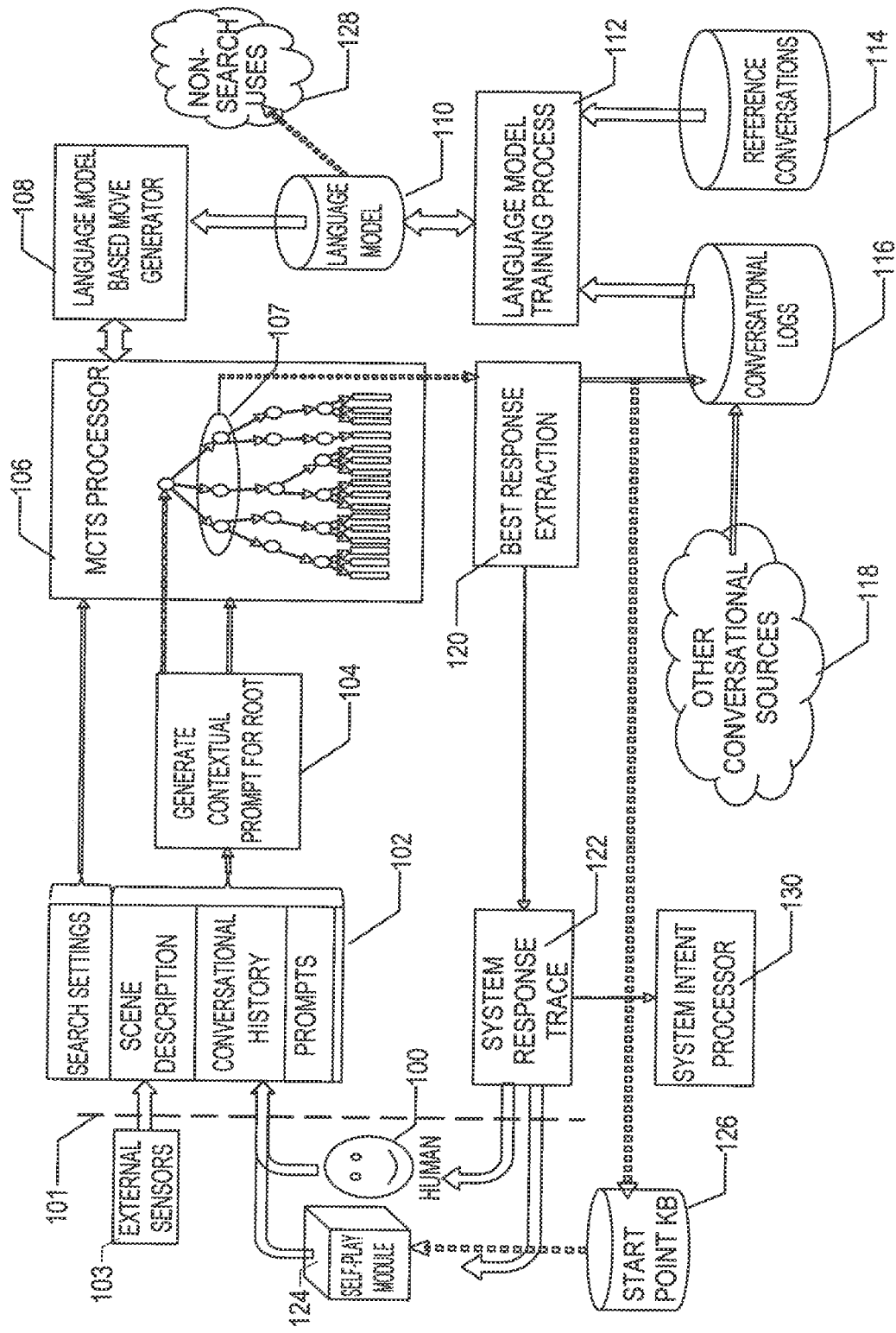

FIG. 2 is a block diagram depicting the overall architecture of a system implementing the AI language methods according to the present disclosure and represents additional details for the process of both deliberative search and learning represented in FIG. 1. An object 100 represents the human or universe interacting through the user interface 101. The external user interface 101 is the primary demarcation of the system and the outside world. The external user interface 101 collects any relevant information such as the user's 100 utterances, sense impressions from sensors 103 or parameters useful to control the search process or to provide context. The combination of processes 100 and 101 correspond to Step 001 in FIG. 1. The user interface 101 provides a packet of information to the system in the form of a contextual description packet 102. This packet 102 includes information for the search settings, background information from sensors 103 to provide a description of the "scene" being imagined, the conversational history of the dialog or actions between the system and the human user 100, and conversational prompts given to the language model. A portion of packet 102 provides the search setting used by the MCTS processor 106. The other portion of packet 102 provides the conversational context and scene description which are passed to the contractual prompt generator 104 which generates the initial contextual prompt given to the MCTS processor 106 and is applied at the initial node or root of the MCTS processor 106. This is required to provide a description that fits within the processing capacity of any language model being used. The combination of processes 102 and 104 correspond to Step 002 in FIG. 1.

The search process 106 uses the information provided by the root node generation process 104 and search settings from packet 102 to conduct a search for an action with the highest expected future reward from the set of possible initial actions 107, using best response extraction process 120. The search process 106 in the initial embodiment uses Monte Carlo Tree Search or MCTS. MCTS requires that the state description encapsulated by each search node provide four functions: "getPossibleAction( )" returning a list of actions (conversational or otherwise) that can be taken from that state, "takeAction(action)" which returns the new state from taking that action; "isTerminal( )" which reports if a state is a terminal or leaf state; and "getRewards( )" which returns the evaluation for that state (if it is terminal).

The "isTerminal( )" expression in a report is true if the node is a leaf in the tree and requires evaluation, and "getRewards( )" which is given if the node returns an evaluation value (the expected reward) for the state if the state is terminal. While depth of node is used in the disclosure for illustrative clarity, other criteria may be used to determine the true value of "isTerminal( )", such as detecting a projected end of conversation, session or communication. Given the four functions defined for a given domain, the MCTS algorithm will return the best initial action by simulating a "game" of carrying out actions and examining the rewards of the eventual outcomes. This process is currently the most successful method used by AI's that play games with complete information like Chess and Go and incomplete information like bridge, poker and Starcraft. MCTS automatically balances its search process between exploration of new move possibilities with exploitation of known successful paths. As a search method the family of MCTS algorithms are actively being researched and developed.

A Non-linguistic State Space Simulation operates textually at a Situational Report level. The states are the reports, and the system imagines or projects how reports evolve due to imagined actions or events using the tree search process. Much like the examples given above, there can be many different changes or variations in that the functions evaluate based on the domains. There can be state spaces and search spaces that can each have different details or accounting requirements. Some search spaces are more detailed and have more "accounting" (for example, a game board or logistics/resource allocations). These alternate states can be translated into textual reports and can be processed by the normal linguistic search process. The reports can allow for information to be parsed or associated based on additional characteristics. For example, there can be an association between a linguistic search state and a detailed accounting search state. This can allow for a dual search and state method, with search in either state spaces. With this an engagement with an external simulator may allow for additional maintenance of the state association and allow for communication with a main search process. The communications allow for transparency between the states, the search, and analysis. The transparency can allow for both a numerical accuracy of the reports, but also conceptual coverage linguistically.

One insight of the current invention is that three of the four functions can make use of recent advances in broad coverage language models 110 to provide move generation 108 from contextual descriptions of an ongoing conversation or interaction and also to provide part of the necessary evaluation function required by the "getRewards" function of MCTS 106. In particular, by prompting the language model with the initial start (or prompt) of an evaluation phrase such as "I feel . . . ", "I believe . . . ," or any phrase that would normally lead to the statement of an ego-centric opinion on the state of the situation at that point in the dialog, an evaluative statement will be generated.

Another insight is that this linguistic/symbolic evaluative statement generated by the language model can be converted into a numeric value by application of a sentiment analysis (or other linguistic classification) function, which returns a numeric positive or negative value for a given statement. The sentiment analysis of linguistics can allow for evaluation scores to be generated using modern neural processing. Linguistics can also allow for a reinforcement of natural cadences, or syntax, reinforcing natural flow and structure in generated responses or evaluations, and thus can elicit additional human feedback. This allows for an environment to be used in a dynamic feedback loop framework where numerical trial-and-error assessments based on the linguistic characteristics of conversational exchanges and interactions (real or simulated). Such a framework enables the system to iteratively refine its decisions with the objective of optimizing outcome scores. The system that utilized the analysis can be an agent that makes the choices to maximize rewards of the analysis. In some of the examples presented herein, the AI language virtual agent may be the MCTS processor or prompt generator.

MCTS uses these evaluations of the leaves of the search tree to generate an expected average value for each possible initial action. The use of reinforcement learning tries to maximize the average value in a way that allows for additional information to be analyzed and achieve more accuracy overall. Another feature of MCTS is that it can function as an "anytime" algorithm, which means the longer it runs, the better the estimated values, but at any time (e.g., due to time constraints) one can stop the process and receive plausible estimates for the best initial action. Process 120 extracts the highest ranked response from the MCTS search, along with other trace or log information. Process 120 corresponds to Step 004. This information is sent to the system response trace module 122 which will send the selected response to either the user or the self-play module 124, and to the conversational logs 116, for self-play-based learning. The AI language virtual agent as described herein, can further including a modeled creativity feature. A self-play and iterative refinement module may be used by the AI language virtual agent to generate creative responses. These creative responses may allow for alternative options and trial and error to be analyzed with each iteration. This allows the AI language virtual agent can demonstrate innovative problem-solving capabilities and providing alternates to complex problems posed in natural language dialogue.

Language model 110 corresponds to Language model 008 shown in FIG. 1. The MCTS processor 106 fills the role of Step 003 shown in FIG. 1. Optionally, a System Intent Processor (SIP) 130 may be included, to translate and interpret the utterances and control statements generated by the system into computational, retrieval or control actions. SIP processing may occur on either or both sides of the external user interface 101. The system intent processor is like giving the system its own Siri™ or Alexa™ type device. The SIP 130 turns the English output of the system (which may be a goal or direct command) into an action. The SIP 130 is a separate module that listens to the overall system output and executes requests it recognizes. Multiple methods exist for implementing such intent processors. The user interface 101 and the System Intent Processor 130 correspond to the Step 007 shown in FIG. 1. The language model or models 110 used by 108 and 106 may be either statically fixed or continuously trained by a Language Model Training Processor (LMTP) 112. LMPT 112 can either accept training material from a corpus of reference conversations or examples of language usage 114, or from the conversational logs 116. The conversational logs 116 record the best system response given each input from the human 100, the self-play module 124 or other dynamic sources 118 such as internet search and extraction. The Language Model Training Processor 112 corresponds to the Step 011 which is shown in FIG. 1. Storage 116 corresponds to Step 009 and storage 114 corresponds to Step 010. Information from the search analysis process in Step 120 can be used to create records to seed the self-play module 124 with start points stored in a start point data base/knowledge base (DB/KB) 126 or other stores for future exploratory conversations. The self-play module provides all the information required for the context packet 102 to continue exploration of possible continuations of conversations. An interface to the start point KB/DB 126 can be provided to insert new exportation points from external sources such as human users.

The use of LMTP 112 from source referencing conversations stored in data files 114 and conversational logs stored in data files 114 improve the operation of the language model 110 as both a move generator and evaluation generation model. In some uses of language model 110, the search process of 106 may be too expensive in terms of time. The LMTP process in fact causes the language model to lossily summarize, compress and compile the information derived from the tree search. As such, the trained language model 110 can be used for non-search applications on remote servers 128, where simple input/output operation of an enhanced language model is desired. Non-search applications for remote servers 128 may be realized through transfer learning, by training a simpler language model on the system output. An AI language virtual agent as described may allow for an AI module enabling cross-domain knowledge transfer. This transfer of information can allow for problems to be analyzed with multiple domains of information which can increase the accuracy of a response. Similarly, the AI language virtual agent utilizing cross-domain knowledge transfer can elevate strategic discourse by applying learnings from one domain to a different domain without requiring domain-specific retraining, demonstrating increased versatility in responses.

The primary function for the system as a whole is analogous to the operation of the self-teaching game system AlphaZero/MuZero, except that instead of operating in a zero sum game space like Chess or Go, the space the described system operates within is the space of dialog, conversation and interaction (both virtual and embodied). An AI language virtual agent can incorporate strategic depth by prioritizing long-term outcomes over immediate ones using AlphaZero/MuZero-like foresightedness. This could be articulated as the agent's capacity to select interim responses that may initially seem counterintuitive but contribute to a more successful long-term interaction strategy. For example, if a prompt and response are for a game it can allow for the longer term outcomes and strategies of the game to be analyzed. By strategically selecting responses and actions in view of more distant objectives, the agent would emulate the complex strategic reasoning of a seasoned advisor and provide considered counsel even in dynamically changing interactions. Here, the system could pertain to an embodied agent providing strategic advice, or a wholly abstract advisory system interfaced via an embodied agent.

An AI language virtual agent can be embodied in physical or virtual agents, who interact with users in real-world situations. By physical agents we include systems that are running and/or operating on a computing device, server, or processor. By using the aforementioned chain (MTCS) and tree of thought reasoning along with prioritization of long-term strategy in delivering responses and actions the agents are empowered to offer cogent advice in strategic proceedings be it board level business decisions or socio-political engagements. This empowers the agents to offer cogent advice in strategic proceedings be it board level business decisions or socio-political engagements. An AI language virtual agent may function as a strategic advisor utilizing an embodied agent merely as an interface. The interface may take the form of a user interface or an Application Program Interface (API). The strategic advisor assesses context, anticipates shifts in interaction, and provides strategic counsel to guide decision-making, exemplifying the capacity to advise on intricate affairs such as policy formulation, corporate strategy, or diplomatic negotiations. By valuing long-term strategy over immediate responses, the AI can meticulously plan and propose tactics that aligns with the user's overarching objectives.

Figure 3:
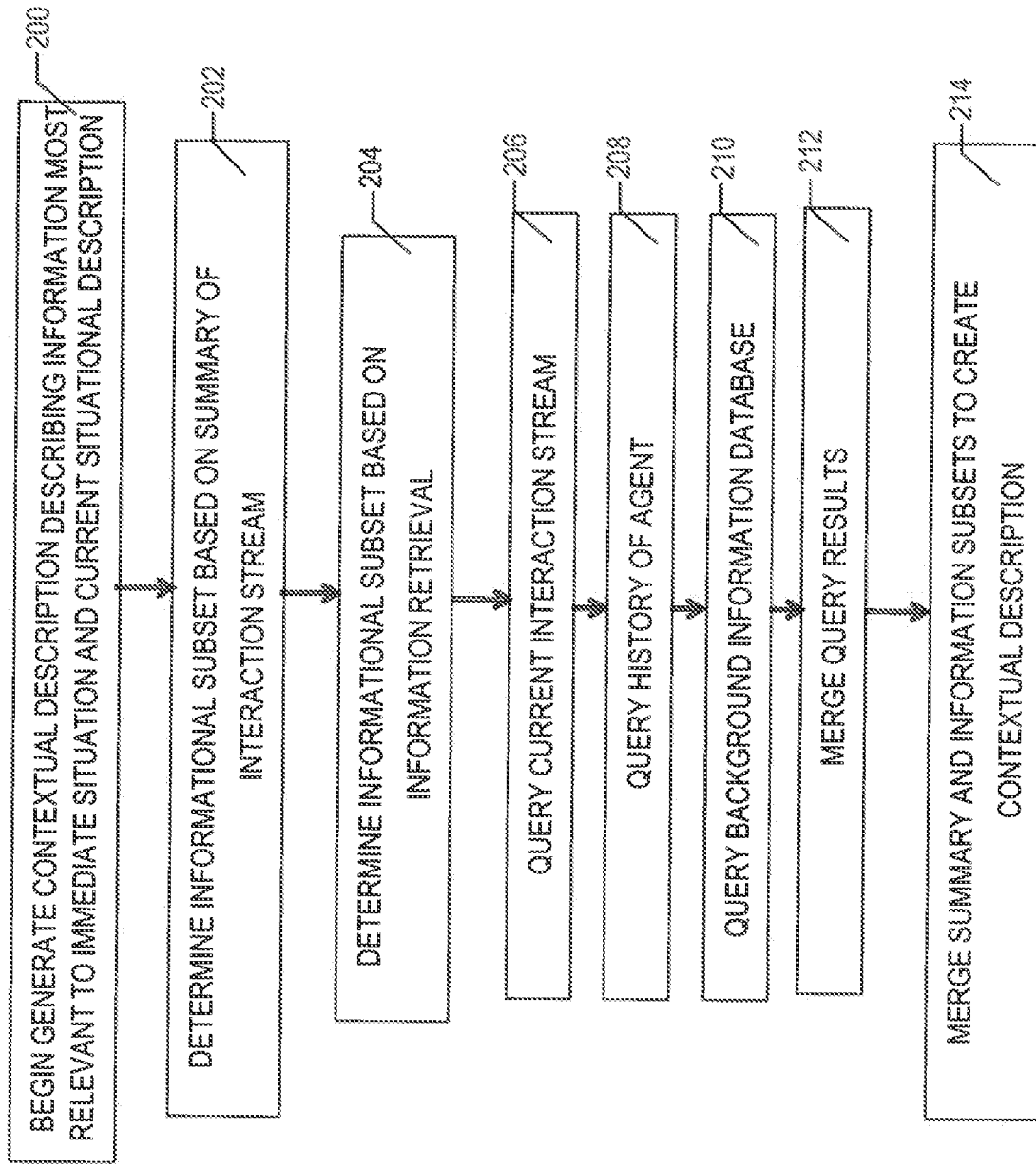

FIG. 3 is a flow chart depicting a process for generating a contextual description. Input information is accepted which describes the current situation and global context from various sources, in natural language form, background information, and a log of recent history, which may be empty when the process begins. Most language modeling processes developed to date either return an estimated probability for tokens by utilizing a flat probability or one which in some way is conditional upon a sequence of tokens over a window of some maximum depth. The goal of the contextual description generation process is to ensure that the information most relevant to language model generation process is selected and fits within the processing window of the language model. The context generation process must rank all available information to ensure the most salient information to the current situation (and any problem posed) is presented in a package to the deliberation process and that it fits within any processing constraints of other modules.

In a method for AI language self-improvement agent using language modeling and tree search techniques as described herein, where the agent can utilize a contextual interface interchangeable with an external state simulator or server that maintains real-time tracking of global states. This allows for the global states to be used as part of the analysis, which as described above can provide background information, log information, and other contextual information. The interface accommodates natural language instructions or action mandates from the AI agent and reciprocates with natural language descriptions of the current state. To simplify this, a natural language instruction could come from a user, or the agent that can then receive responses in a similar natural language form. This allows for an ease of operation and understanding. The AI language virtual agent can utilize the external state simulator or server to provide comprehensive account keeping details in addition to producing numeric evaluations of the state, enhancing the agent's understanding of the surrounding environment and its responses to the same. These numerical evaluations may be utilized to create scores that allow for the ranking of the results.

The process begins with Step 200. In step 202 a summary is created of the most relevant information from recent history of the interaction stream. The summary captures the "gist" of the current situation. By way of a non-limiting example, in some implementations the Textrank text processing method maybe used to provide summarization of the collection of recent text being summarized. Other automated methods are known where a language model may be used to produce summarizations of text. Given that current State of the Art language models using the transformer neural model utilize an internal model of attention, it is useful for an attention-based summarization system to be employed. Textrank implements a simulation of where attention would be focused over a graph of nodes representing a corpus of text. Also, just as Pagerank has topic focused variants, Textrank can be modified to provide topic focused summarization. The primary benefit of using Textrank is the ability to provide extractive summarization over arbitrarily large historical logs.

The process then proceeds from Step 202 to Step 204 and begins to determine key word queries from the then current summary of the interaction stream determined in Step 202. The process proceeds from Step 204 to Steps 206-210. In Step 206 the current interaction stream is queried for relevant content to the queries. In Step 208 the history of a respective agent developing the conversation is queried for relevant content. Similarly, in Step 210 the background information database is queried for content relevant to the keywords determined in Step 204. The process then proceeds from Steps 206, 208 and 210 in parallel to Step 212 in which the results of the respective queries are merged. In Step 212 the query results are combined, ranked and sorted. By way of a non-limiting example, in some implementations TD-IDF based or vector based text retrieval methods may be used to query each background data source.

Then in Step 214 the results from the summary of the information stream from Step 202 is merged with the summary from Step 212 to provide current situational input from multiple relevant information sources. It is via this merge process in Steps 212 and 214 that information most directly relevant and associated with the current input from the recent conversations is made available to the context description. The merged output of Step 214 provides a final contextual description that fits the constraints of downstream processing elements. One such typical constraint is that the total length of the contextual description must be less than some maximum, usually determined by the processing capacity of language modeling technology or method. For example, current implementations of GPT-2 and GPT-3 have processing windows of generally less than 2048 tokens. The final merging process would select the highest-ranking set of collected information that fits within the 2048 tokens. A simple greedy sort and merge process is illustrated, though other methods such as evolutionary or other search methods may also be utilized, and is detailed later in FIG. 17. The task of delivering the highest value product in a fixed sized carrier maps to the mathematical area known as packing problems in the field of combinatorial optimization. In particular we wish to maximize the relevant information presented to our language model for analysis and use the work done on the fractional knapsack problem; since while in the general case the optimization problem is NP-complete, the fractional variant admits a good polynomial time greedy approximations. Also, dynamic programming and genetic programming methods exist which may be of use for larger scale or different variants (possibly multi-modal problems), and may be relevant when the option set is continuously or asynchronously updated and an "anytime" update capability is desired.

Figure 4:
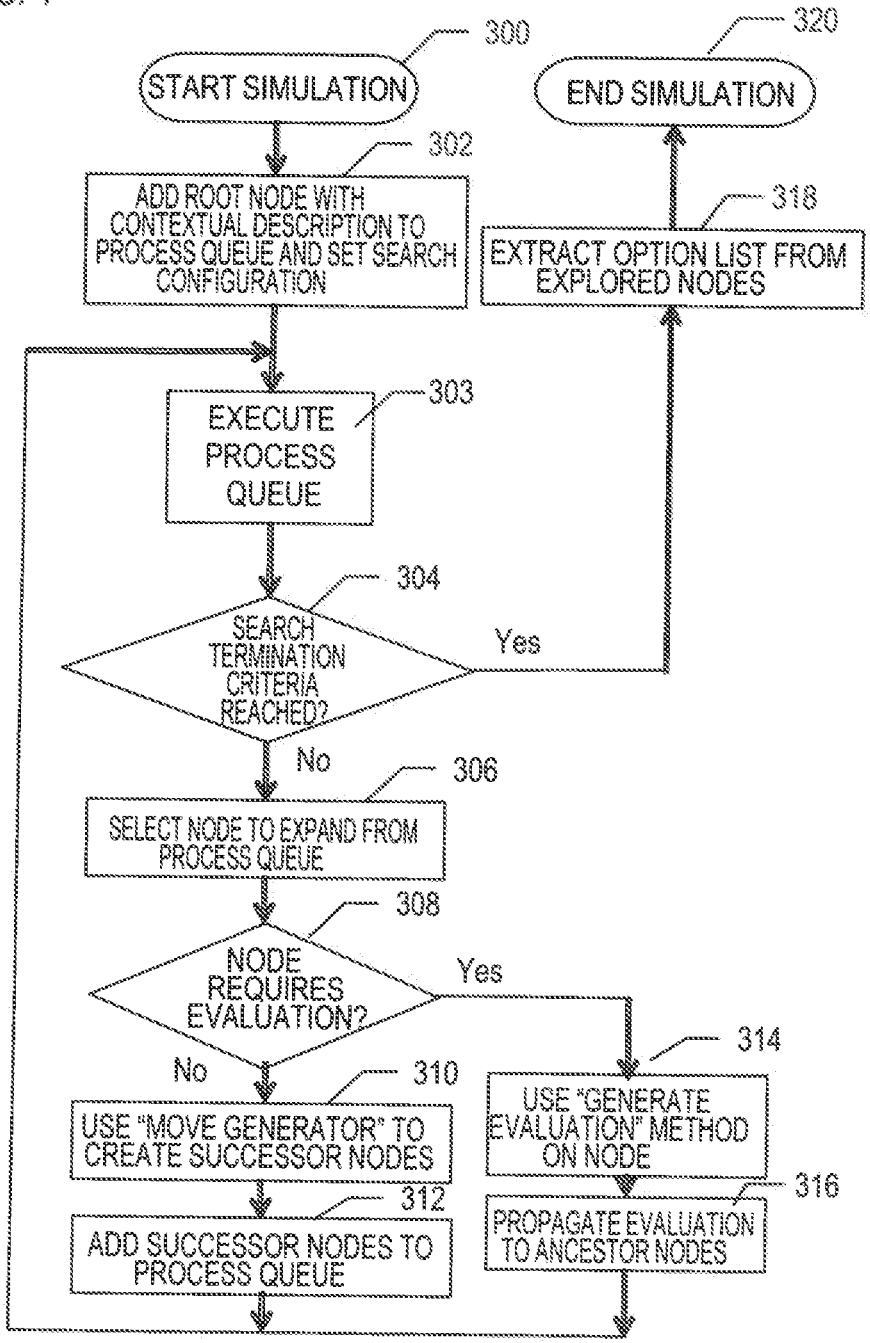

FIG. 4 is a flow chart depicting an abstracted tree search process (of which MCTS is a variant) which utilizes the contextual descriptions in a deliberative search process to render and select a next action. or utterance for speech, based on the projected expected outcomes as determined by the search process. The text generation search process is provided by simulating an "internal dialog," through a self-talk virtual imagination process. The process begins with Step 300. In Step 302 the contextual description of Step 214 of FIG. 3 and the root node of the search process are added to the process queue, along with a set of parameters for the search configuration. The search configuration will include a selection of one or more language models on which the self-talk virtual conversation occurs. The search configuration would include everything necessary to define the initial search condition, the parameters of the search process, and the evaluation criteria and termination of search criteria. While defaults may be used, custom parameters may be specified for each and include information to define the initial node, any search constraints (the maximum resources to use in terms of time, memory, nodes to be processed, evaluation method to be used, expansion rate at each level, etc.), models used other than the defaults for generation and evaluation and information that might influence either (such as custom prompts), and response generation parameters (length of response generated, sampling parameters such as temperature, cutoff probability, etc.). The contextual description may include information regarding the selected personality and motivation of the virtual agent being simulated, as well as selected parameters and perceived parameters regarding the personality and motivation of the other various participants to the conversation exchange. For example, the virtual agent may be defined as being helpful, cheery and talkative. Such adjectives will influence the language model generation profile, which in turn influences the sentiment of text associated with the given character. The abstracted tree search process may be utilized to translate linguistics to sentiment evaluation scores to utilize modern neural processing.

Similarly, the projected and perceived traits of personality and motivation of the other various participants will also affect the simulated paths of the self-talk imagination process rendered by the search process. These assigned traits of the virtual agent and those of the participants may also be included in the search configuration. The initial parameters from Step 302 are input into Step 303 and the process queue is executed. The results of the execute process queue of Step 303 are then input into Step 304. Step 304 determines whether the termination criteria has been met; and if so, the process proceeds to Step 318 in which an options list is extracted from the current search results and in Step 320 the simulation will end.

If in Step 304 a determination is made whether the search criteria has been reached. The search termination criteria may require that at least one evaluation to have been performed and that some specified resource has been exhausted. Typically the exhausted resource may be real wall clock time expended, a number of node expansions, a lack of diversity in options (indicating total search space exploration), or convergence of the values assigned to the top level nodes. MCTS has the properties of being able to incorporate any of the above criteria into its termination condition. If a determination is made in Step 304 that the search criteria has not been reached, the process proceeds to Step 306, and the next node is selected for adding to the process queue. Next the process proceeds to Step 308, and a determination is made of whether the node requires evaluation. If a determination is made in Step 308, that the evaluation is not required for the selected node, then the process proceeds to Step 310 and a move generator is implemented to create one or more successor nodes. Then in Step 312 successor nodes are added to the process queue and the process proceeds to Step 303 to process the nodes in the process queue, and then after Step 303 the process returns to the search termination criteria evaluation in Step 304. If instead in Step 308 a determination is made that the node selected in Step 306 requires further evaluation, the process proceeds to Step 314 and a "generate evaluation method" is applied to the node. The process then proceeds to Step 316 and the values of the "generate evaluation method" are applied to the ancestor nodes of the node selected in Step 306. The process then returns to the process Step 303 and continues.

The search process uses a move generation method 310 to propose new actions that are then used to create new contextual descriptions by appending the proposed actions to the existing contextual description, changing the prompted actor variable as required. This describes a state space search, where the state is defined by an actual series of events and utterances and the simulated set of events and utterances are used to reach a certain point in time. The simulated events or utterances are generated by the language models predicting the logical continuation of the sequence used to reach a given state.

An AI language virtual agent can incorporate LLMs capable of producing executable code given a problem description, thereby providing a viable solution to the specified problem. These problem-solving abilities can provide significant resources as it can focus on specific code provisions, or even whole modules of code. Similarly, when an AI language virtual agent use the LLM to drive a dynamic state simulator, and that dynamic state simulator allows for generating executable code that alters one state representation into another there can be numerous possibilities opened up. For example, this dynamic state simulator demonstrates a broader state expansion and efficient leaf evaluation. Additionally, an AI language virtual agent can support the utilization of any available resources, planning, or computing capabilities by virtue of the code produced for state expansion and leaf evaluation to provide optimum responses. Using the various search processes and processing system described herein, the AI language virtual agent may utilize the output generated through the dynamic state simulation driven by LLM-written code, and translate the operations of the code into natural language or various compatible embeddings for improved interaction with external agents. The AI agent can include self-improvement agent that incorporates a state simulator stimulated by the LLM, wherein the LLM formulates operational code to cycle through states and appraise the outcomes, thus enabling the AI to adapt and detail newly generated states.

Each node in the state space search consists of a context description that contains the sequence used to reach the state represented by that node. Each node also contains ancestor node information where the ultimate ancestor node is the root node of the search tree and the root node defines the initial input to the search process. Each node contains information on the action that was taken to transition from the ancestor to the current node. This is the output of the language model that is appended to the ancestor node contents to generate the current node. Each node contains an evaluation value, indicating either the final evaluation of a leaf node in the search process or the estimated reward value of the descendent nodes. Each node contains a value signifying the distance which that node is located from the root node, along with visitation frequency information. This information allows depth constraints to be placed on the search process and the expected reward to be computed. An AI language self-improvement agent can use language modeling and tree search techniques according to the present disclosure. The self-improvement agent can include a contextual interface interchangeable with an external state simulator or server that maintains real-time tracking of global states. The real-time tracking of the global states, allow for rapid processing and/or analysis and updating of the external state simulator or server. The interface may accommodate natural language instructions or action mandates from the AI agent and reciprocates with natural language descriptions of the current state. The ability to interact with the interface using natural language that can allow for increased interactions and understanding what each response can include. The AI language virtual agent may also interact with the external state simulator or server to provide comprehensive account keeping details in addition to producing numeric evaluations of the state, enhancing the agent's understanding of the surrounding environment and its responses to the same.

The move generation Step 310 is implemented and expands upon a node's context description and generates a new node with a new context description by using the node generation process and appending the output generated by the language model, when the distance of the expanded node from the root is less than some threshold or when some other node expansion criteria is met. Changing the prompt used to generate a node expansion may be fixed (implementing say verbal taking turns) or left at the discretion of the language model.

The search process may be implemented with the described node data structure and a queue to hold lists of nodes to be processed. The simulation Steps continue until some termination criteria is met in Step 304, such as expiration of time or exhausting some resource. If the termination condition does not hold then a node is selected from the processing queue for expansion Step 306. The content of the node is examined, and based on depth (or other criteria), a determination of if the node qualifies as a leaf node and requires evaluation or is an interior node and requires expansion. If the node requires expansion, then the afore described node generator step Step 310 is applied to generate one or more new nodes, each with parent/ancestor being the current node that was being examined. Each of the new nodes is inserted into the process queue 312 and control is returned to Step 304. If, however, Step 308 determines that the node is a leaf and requires evaluation, then a separate "evaluation prompt" is used in Step 314.

An AI language virtual agent can include features that allow for providing explanatory depth and real-time strategic adaptation. The ability to use a real-time adaption and to monitor things as they happen means that there more scenarios to check and evaluate. This can include looking at the nodes as described above. As the agent offers in-depth justifications behind its strategies and decisions, adapting strategies in real time based on unfolding situations, these self-analysis can be used to reevaluate many of the strategies and decisions used for guidance and results. This means that the agent or systems, can work to enhance its strategic intuition, transparency, and responsiveness in complex interactive scenarios. The virtual agent could describe its internal decision-making process, providing explanatory depth to its actions-a valuable aspect in strategic decisions, allowing users to understand the reasoning behind proposed plans or strategies. Also, the virtual or language agents could adapt strategies based on developing situations in real-time. This feature could be useful in dynamic environments where situations change rapidly, and the agent needs consistent strategic alignment with both user goals and the world.

The evaluative prompt is a prompt to the language model to summarize the situation described by the contextual description of a node in a way that is easy to evaluate using either sentiment analysis or other language classification methods. Once evaluations are made in Step 314 and Step 316, values are propagated back through each of the linked ancestor nodes to update each ancestor node value. An AI language virtual agent may employ Reinforcement Learning or Deep Reinforcement Learning techniques in combination with language models and tree search methods to optimize textual responses. As these textual responses are optimized the ability to learn real time, or real world textual information allows for new discoveries and/or the ability to generate new responses in real time. In some examples, the AI language virtual agent can include a feedback mechanism that allows the external agents to rate and review the performance and the responses of the AI language virtual agent. This allows the system to learn the accuracy of its responses and allow it to further refine its abilities. Which then allows for analysis, and used for self-improvement and learning. This further allows for the translation of linguistics to sentiment evaluation scores to include modern neural processing.

Once the search termination criteria is reached, the search process returns in Step 318 an option list consisting of the language model derived actions that lead to the immediate descendant nodes of the root node, along with each of their expected long-term values as estimated by the simulation process of each action. Ultimately the agent will use the option list generated to select the next action either deterministically or probabilistically. By way of a non-limiting example, the afore mentioned search process in some implementations may use Monte Carlo Tree Search to implement the optimal action search process in FIG. 4.

With regard to Step 306, it is known that various criteria used to select the next node to process produces various search behaviors (depth-first search, breath-first search, best-first search, A* search, MCTS search). The data structure of the node is modified to contain such data as to make the desired search behavior possible, notably (but not necessarily limited to) the nodes distance from the root, estimates of the average value of child nodes, and estimates of the value for leaf nodes. Optionally, any heuristic value of distance from some goal state may be included; however, the estimate of average descendant value may be used as a proxy.

With regard to Step 316, different propagation behavior results in the emergent property of different overt behaviors. In typical planning for two interacting agents, each agent may choose to minimize or maximize its expected return. This determines the style of conversational game being played and behavior observed. The following "TABLE I" lists by way of example, Evaluation Propagation Policies and a corresponding Behavioral Descriptions: An AI language virtual agent may employ Reinforcement Learning or Deep Reinforcement Learning techniques in combination with language models and tree search methods to optimize textual responses. As these textual responses are optimized the ability to learn real time, or real world textual information allows for new discoveries and/or the ability to generate new responses in real time. In some examples, the AI language virtual agent can include a feedback mechanism that allows the external agents to rate and review the performance and the responses of the AI language virtual agent. This allows the system to learn the accuracy of its responses and allow it to further refine its abilities. Which then allows for analysis, and used for self-improvement and learning. This further allows for the translation of linguistics to sentiment evaluation scores to include modern neural processing.

TABLE I

| Evaluation Propagation Policy | Behavioral Description |
| --- | --- |
| Maximizing the sentiment of all actors | Win-Win Optimist |
| Maximizing the sentiment of the user (while ignoring itself) | Comedic/Entertaining/ Subservient |
| Maximizing the sentiment of system outputs (while ignoring the user) | Narcissistic/Self-centered |
| Maximizing system sentiment and minimizing user sentiment | Sadist |
| Maximizing user sentiment and minimizing system sentiment | Masochist |

The evaluative prompt used in Step 314 need not be limited to just the one actor prompt but can be prefixed with material to influence the evaluation given. This ranges from suggestions to select from a range of evaluation options ("How was the experience: Good, Neutral, Bad? Daxine:' I believe the experience was [EOP]"), to prompts to generate a more open ended scene description ("As the scene closed [EOP]"). "[EOP]" represents the end-of-prompt and is where the language model would insert its continuation.

Figure 5:
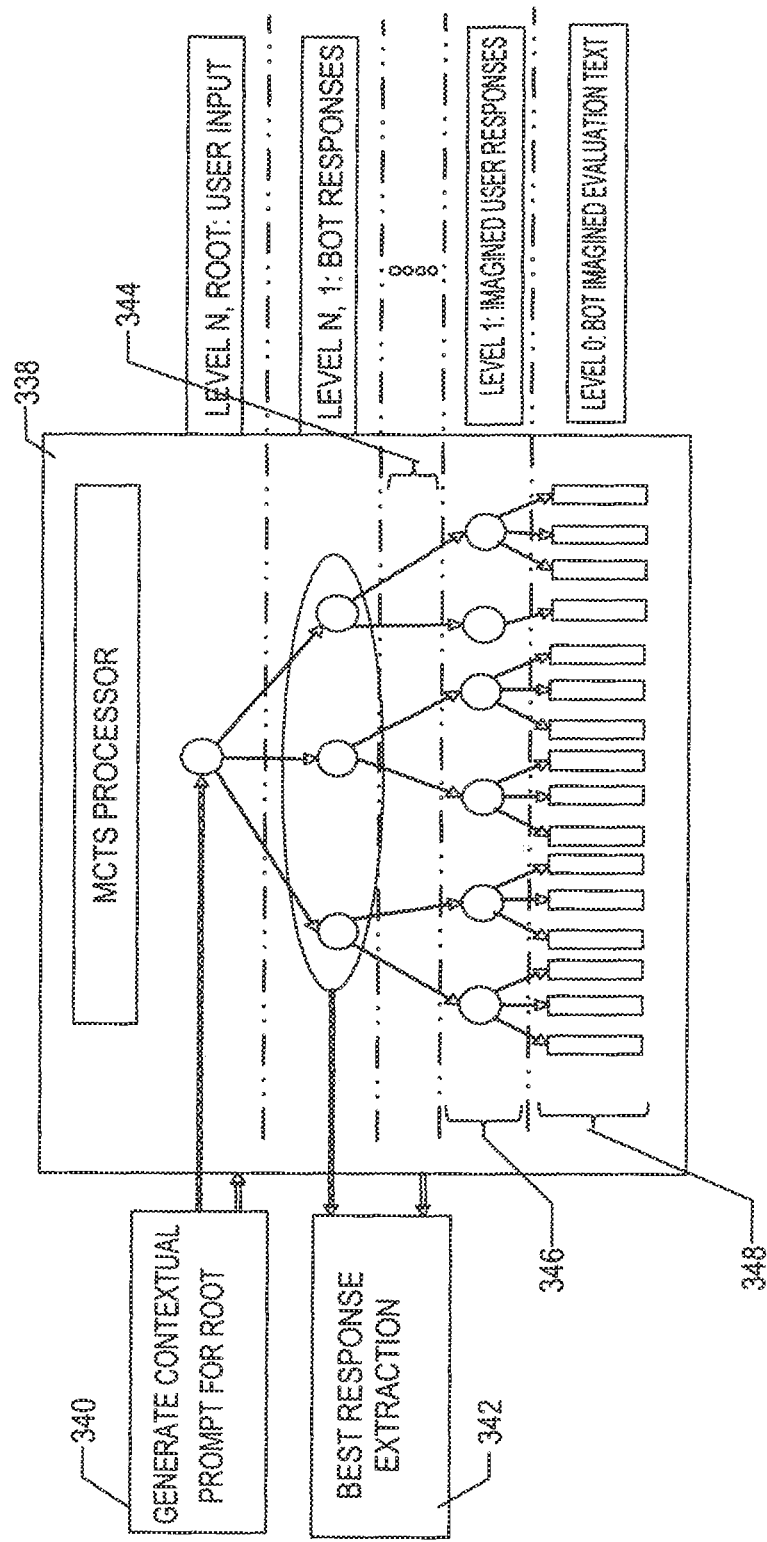

FIG. 5 is a schematic diagram depicting different layers of an interchange MCTS processor 338. The MCTS processor 338 conducts a search based on the description of the individual state, the move generator and the evaluation function. The process of generating the initial description used in the root is performed by module 340. The MCTS processor 338 generates multiple levels N, 1 through Level 0 of the search tree to determine the best response to input. For illustration it is assumed that the MCTS processor 338 is instructed to generate searches of depth N from the initial root node. A typical MCTS may be used without a fixed search horizon. The MCTS processor 338 generates the first layer of Level N–1, and the best response extractor process 342 returns the highest-ranking node, or some selection based on the relative ranking of the nodes in level N–1. As in the normal MCTS process, a number of nodes are generated for one or more additional levels labeled as levels 344 using the language model to create the search tree out to some search horizon, which has the terminal level 348 ("Level 0"). At the pre-terminal level 346 ("Level 1"), the evaluation prompt is used for the nodes of 346 to generate the evaluation terminal nodes of 348. The generated nodes of level 348 ("Level 0") thus contain the text or other information which is converted to a numeric value through a symbolic to numeric conversion process. In the illustration that conversion is done using a sentiment analysis process. For instance, assuming the system is simulating a character named Bob, the evaluation prompt might be:

Bob: "I feel [EOP]"

where "[EOP]" represents the end-of-prompt and is where the language model would insert its continuation.

The Language Model (LM) is prompted to complete the evaluation sentence, based on the total context provided for that node. The text values are then converted to a positive or negative numeric value by the sentiment analysis process, (or any other leaf evaluation process) and the value is propagated back up the tree to update the level N–1 node values. An AI language virtual agent may employ Reinforcement Learning or Deep Reinforcement Learning techniques in combination with language models and tree search methods to optimize textual responses. As these textual responses are optimized the ability to learn real time, or real world textual information allows for new discoveries and/or the ability to generate new responses in real time. In some examples, the AI language virtual agent can include a feedback mechanism that allows the external agents to rate and review the performance and the responses of the AI language virtual agent. This allows the system to learn the accuracy of its responses and allow it to further refine its abilities. Which then allows for analysis, and used for self-improvement and learning. This further allows for the translation of linguistics to sentiment evaluation scores to include modern neural processing.

Figure 6:
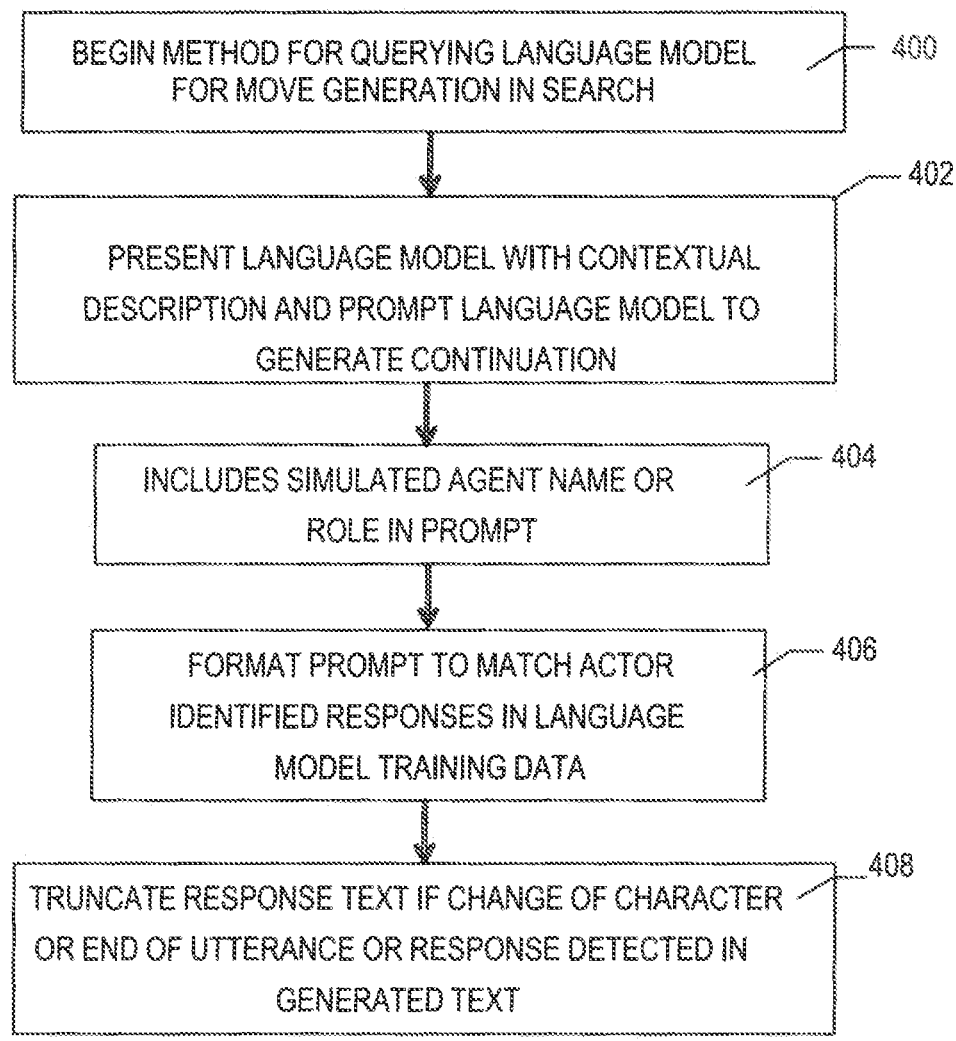

FIG. 6 is a flow chart depicting a move generation process using language models and describes a method of querying one or more language models or knowledge sources, such as using a search tree process, such as with an MCTS processor, to provide the equivalent of "move generation" or node expansion required by the search process. The move generation process begins in Step 400. The language model or knowledge source is presented with a contextual description and is prompted to generate a continuation as output. In Step 402 a prompt is presented which identifies the agent by name or role, (i.e. "John: '", or "Doctor:'", etc.) and is in a format matching the actor identified responses in the language model training data 404. In Step 406 the language generation prompt is preformed and formatted and input to Step 408. In Step 408 the output may optionally be truncated if a change in actor is detected in the generated output, such that the output of the entire process contains only one valid conversational or interaction "move".

Optionally, the response may be generated by rule-based, retrieval-based or other sequence-based generation methods (e.g. chatbot technology, question-answer engine, etc.). The operation of language models can be substituted with rule-based, retrieval based and language model-based continuation or response generation methods. The initial set of options at the root can also be generated by other means, including but not limited to rule-based, retrieval-based or language model based. Also, a fixed set of options may be included or appended to the existing list, such as "unknown" or recognized sets of standard operations (e.g. via user intent detection methods).

Figure 7:
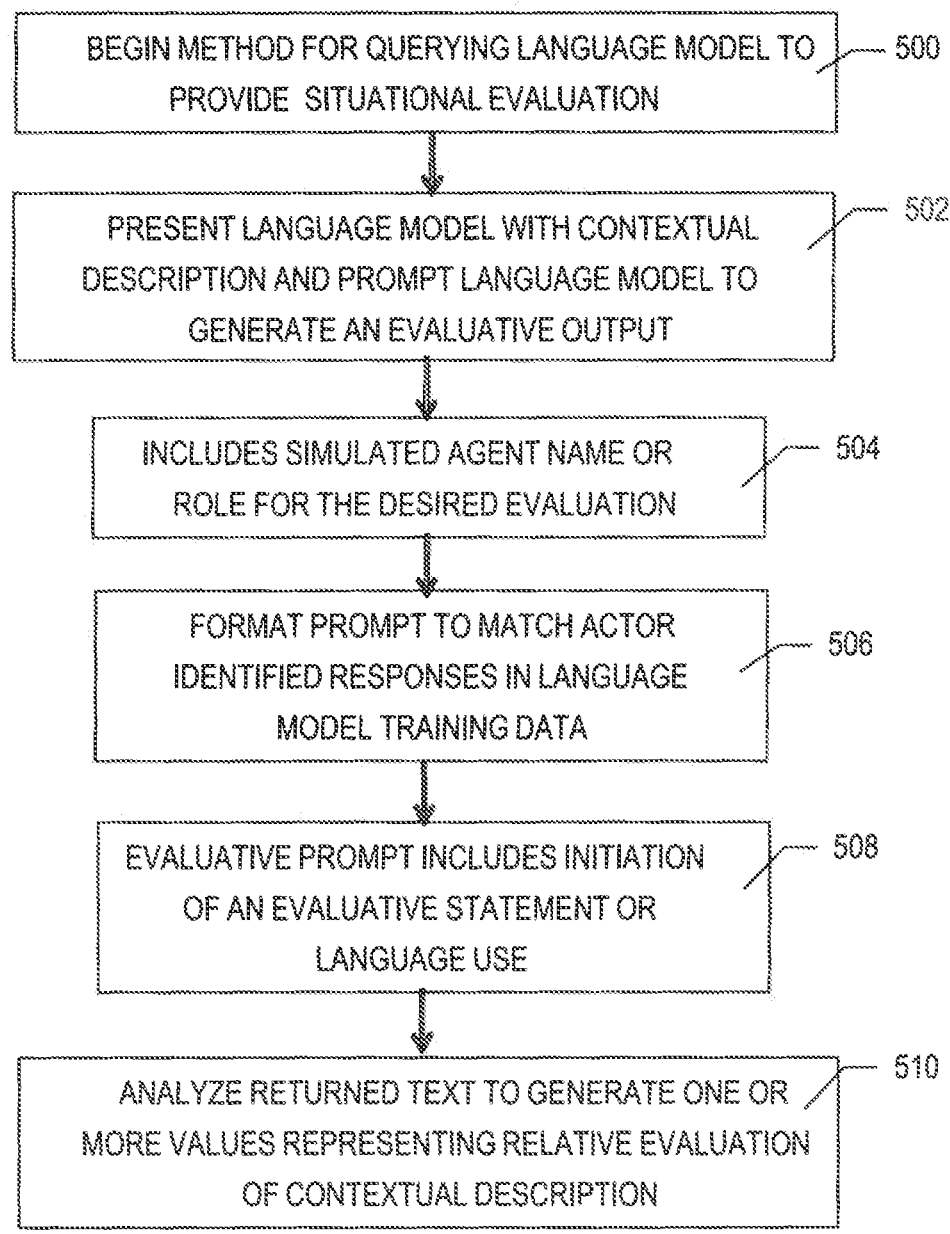

FIG. 7 is a flow chart depicting an evaluation process using language models and outlines the Steps required to query a language model or knowledge source for a situational evaluation as required in Step 314 of FIG. 4. FIG. 7 describes a method of querying one or more language models or knowledge sources to provide the equivalent of an "evaluation" function. The situational evaluation process begins in Step 500 and then proceeds to Step 502. In Step 502 the language model is presented with a contextual description and is then prompted in such a way that the language model will generate an evaluative output to Step 504. The prompt identifies the evaluative agent by name or role in Step 502 and is in a format matching actor identified responses in the content the language model has been trained upon. In Step 504 the name of virtual agent for evaluation is included. In Step 506 the prompt is formatted to match the identified responses of the simulated actor or agent in the language model used for training. In Steps 508 initiation of an evaluative statement or language use is included. In Step 510 returned text is analyzed to generate one or more values representing evaluation of the contextual description. An example might be "John: 'I feel [EOP]'", where "[EOP]" represents the end-of-prompt. In such a case the language model would generate a continuation such as "satisfied with the outcome" or "sad about what happened".

The output of such a generation Step is linguistic or abstract in nature and must be converted into a comparative value. The text returned is analyzed to generate one of more numeric values representing the relative evaluation of either the final evaluative statement or the entire contextual description thus generated. The evaluation process in the initial implementation utilizes sentiment analysis applied to the evaluative statement. Subsequent versions utilize sentiment analysis to train a backoff language classifier since, during processing, a large volume of content is generated and processed. However, the rule-based sentiment analysis system may not return a score in all cases. Examples of text that generate high sentiments scores with high confidence are used to train in an unsupervised way a backoff language classifier. The backoff classifier is used to provide low value estimates when the rule-based system can provide none. However, the language model-based classifier may be used as a generic programmable substitute for the evaluation process and may be trained on both the output of sentiment analysis or statement certainty and modality. An AI language virtual agent may employ Reinforcement Learning or Deep Reinforcement Learning techniques in combination with language models and tree search methods to optimize textual responses. As these textual responses are optimized the ability to learn real time, or real world textual information allows for new discoveries and/or the ability to generate new responses in real time. In some examples, the AI language virtual agent can include a feedback mechanism that allows the external agents to rate and review the performance and the responses of the AI language virtual agent. This allows the system to learn the accuracy of its responses and allow it to further refine its abilities. Which then allows for analysis, and used for self-improvement and learning. This further allows for the translation of linguistics to sentiment evaluation scores to include modern neural processing.

Figure 8:
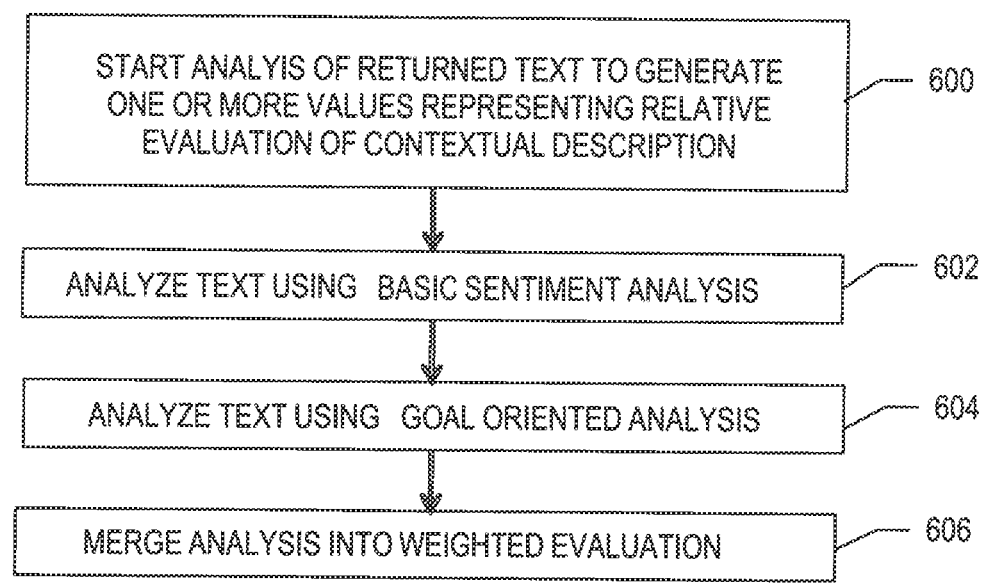

FIG. 8 is a flow chart depicting steps for evaluating the relative evaluation of the contextual description and expands on Step 510 in FIG. 7. The analysis begins in Step 600 and then proceeds to Step 602. In Step 602 the text is analyzed using basic sentiment analysis and then proceeds to Step 604. In Step 604 the text is analyzed using goal oriented analysis and then the process proceeds to Step 606. In Step 608 sentiment analysis of Step 602 and the goal oriented analysis of Step 604 are merged together into a weighted evaluation.

Figure 9:
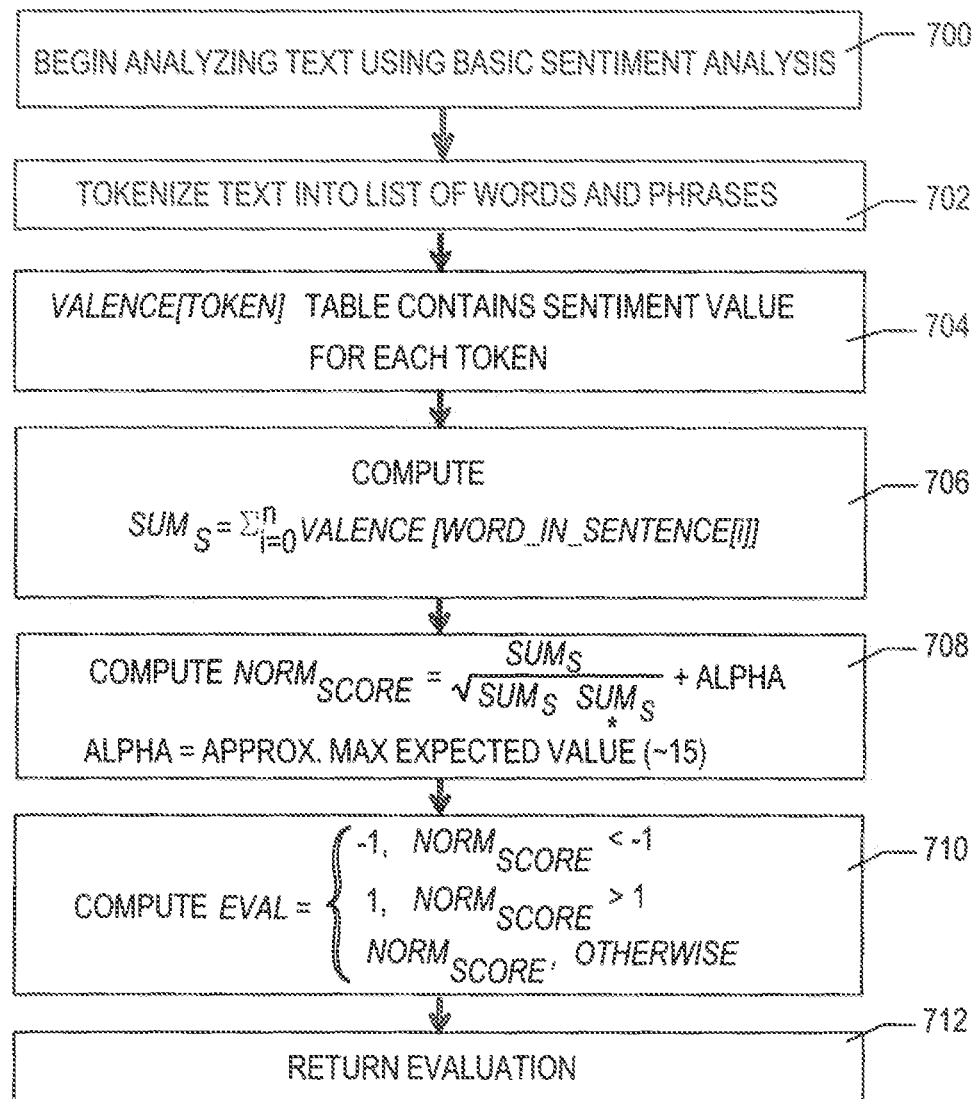

FIG. 9 is a flow chart depicting evaluation utilizing a basic sentiment analysis which expands upon on Step 602 of FIG. 8. The process begins with Step 700 to perform a simple rule based sentiment analysis upon a segment of text to indicate the total polarity of the text ranging from −1 to +1. The text is input to Step 702 which then tokenizes the text into a list of words and recognized phrases, creating a list of tokens. The lexicon contains a valence value (−1 to +1) for each word in the recognized vocabulary. In Step 704 the valence value of each token is looked up in a valence lexicon or a valence table. The valence values are then input to Step 706 in which the overall sum of the valences is computed as the sum of the valence of each token in the sentence. The process then proceeds to Step 708 and a normalized score is computed for the text being analyzed using the following equation:

$$\text{NORMALIZED\_SCORE} = \text{SUMs}/\sqrt{(\text{SUMs}*\text{SUMs}) + \text{ALPHA}}$$

where ALPHA=15 and is the approximate max value expected. In Step 710, the NORMALIZED_SCORE is clipped, so as to remain in the range (−1, +1). In 712 the NORMALIZED_SCORE is returned. The results of the Steps of 700-710 result in the general positivity and negativity being returned for a given statement expressed in text, relative to the values placed in the valence lexicon. By way of a non-limiting example, in some implementations a rule-based analysis like a VADER analysis, or another sentiment analysis method may be utilized.

Figure 10:
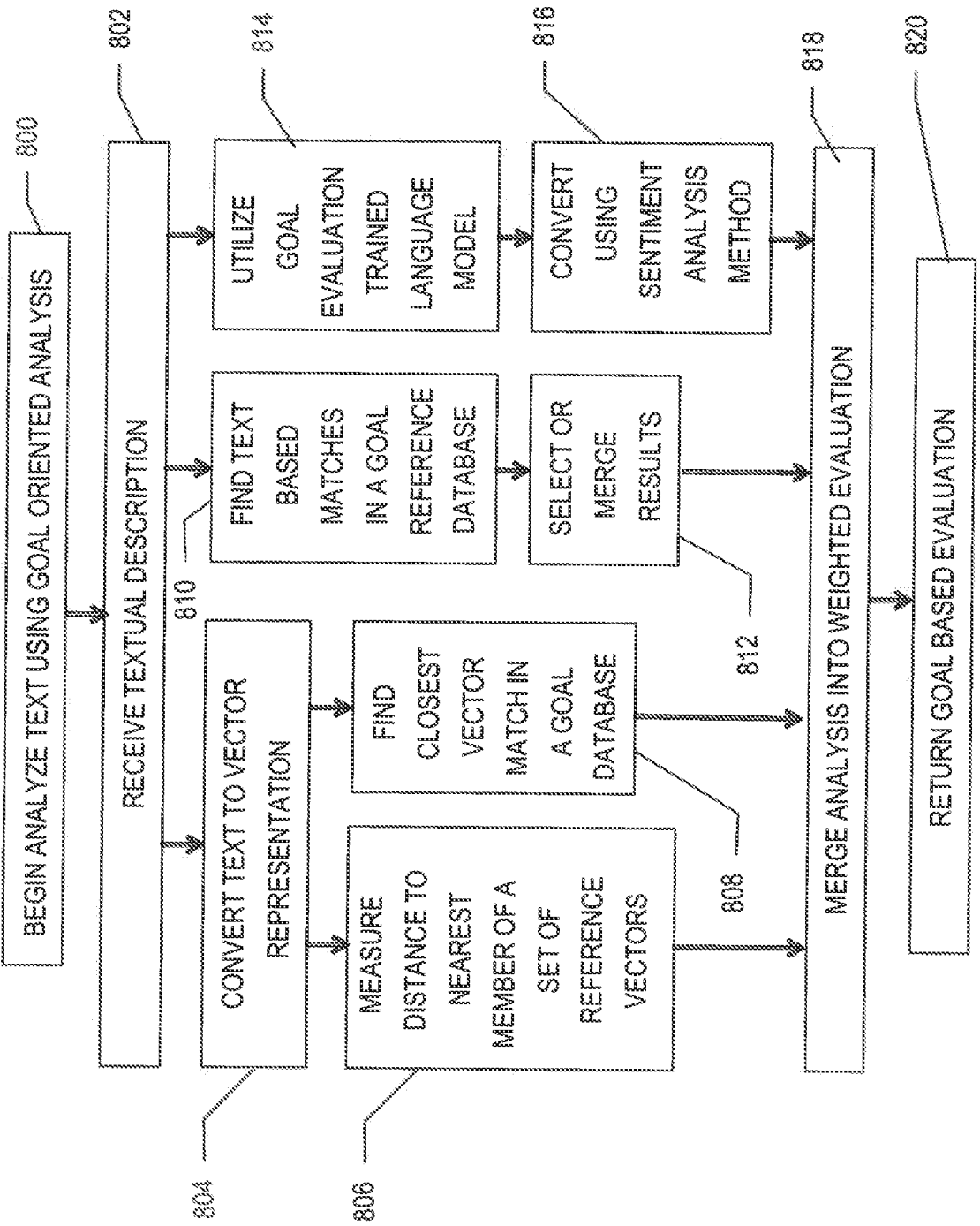

FIG. 10 is a flow chart depicting evaluation utilizing a goal oriented analysis and expands on Step 604 of FIG. 8. The analysis details various methods to analyze the returned text to generate one or more-values representing relative evaluation scores of the contextual description based on a basic goal-oriented analysis. In such an analysis the purpose is to return a value that indicates relative distance from some goal state (factuality, agreement, statement of ground truth, etc.). Various analysis methods may be employed individually and independently or in conjunction and in parallel. The process begins in Step 800 and then proceeds to Step 802. In step 802 the process receives a textual description to be evaluated and is passed to one or more subprocesses that perform text comparison. The process will then proceed in three parallel paths to Step 804, Step 810 and Step 814, respectively. In a first parallel path beginning with Step 804 the text is converted into a vector representation which is passed in parallel to Step 806 and Step 808. In Step 806 the distance between that vector and a relatively small set of reference vectors, and the nearest distance is returned. Here, vector refers to vectors encoding semantic information and numerous methods are known to generate them (word2vec, sent2vec, doc2vec, GLOVE, word vector embeddings used by various language models, random projections, etc.) A small reference set may be derived from a small set of initial target statements input at the start of the processing. The output of Step 806 is output to Step 818. In Step 808 the vector is used as a query to a larger vector database, which may represent longer-term goals or evaluations, and then output to Step 818. By way of a non-limiting example, in some implementations Approximate Nearest Neighbor search methods may be used in determining the most relevant vector-based match from a database or reference set. The second parallel path begins from Step 802 and moves to Step 810, and in Step 810 text based matches are found in a goal reference database. The matches found in Step 810 are input to Step 812 in which the matches are selected or merged, and then output to Step 818. Text-based queries may be applied to a database of reference sets of the form (text→value) or (vector→value). The output of the database query is ranked and merged into an output set. By way of a non-limiting example, in some implementations a language model may be trained to receive a goal statement and a textual description to be tested and that evaluative model would return an evaluative response for the value of the text test relative to the goal text with an interpretation process similar to that for sentiment evaluation employed. (i.e. v=sentiment (eval_model (goal statement, input))).

The AI language virtual agent can utilize a blockchain-based secure database for storing and accessing the data for training and self-play in a secure, transparent and immutable manner. The blockchain-based database allows for secure and transparent actions. Similarly, there are needs for trust in a distributed simulation environment, the blockchain allows for the distribution of data and in some examples the environment as well. The blockchain's proof-of-work concept for load sharing, and prevention of spamming of the evolving search space as it allows for verification of activities by multiple devices and chain participants. Similarly, there can be fractional verification with some percentage of the output of all workers, including trusted workers, are selected at random for verification to ensure trustworthiness and further reinforces the system's security and trust by making sure that even trusted sources are subject to scrutiny to prevent any malicious activities or errors.

In the third parallel path moving from Step 802 to Step 814. In Step 814 a goal evaluation trained language model is used to find text based matches which are input into Step 816. In Step 816 the matches from Step 814 are converted using sentiment analysis methods. In Step 814, a traditional text classification system is employed where such a system utilized simple features, such as character and word n-grams and simple linguistic features. Text classification methods based on naïve bayes, perceptron, support vector machines, k-nearest neighbor, TF-IDF and others may be employed. In Step 818 the output of the various analysis methods are merged into a final weighted evaluation score and returned in Step 820. An AI language virtual agent may employ Reinforcement Learning or Deep Reinforcement Learning techniques in combination with language models and tree search methods to optimize textual responses. As these textual responses are optimized the ability to learn real time, or real world textual information allows for new discoveries and/or the ability to generate new responses in real time. In some examples, the AI language virtual agent can include a feedback mechanism that allows the external agents to rate and review the performance and the responses of the AI language virtual agent. This allows the system to learn the accuracy of its responses and allow it to further refine its abilities. Which then allows for analysis, and used for self-improvement and learning. This further allows for the translation of linguistics to sentiment evaluation scores to include modern neural processing.

Figure 11:
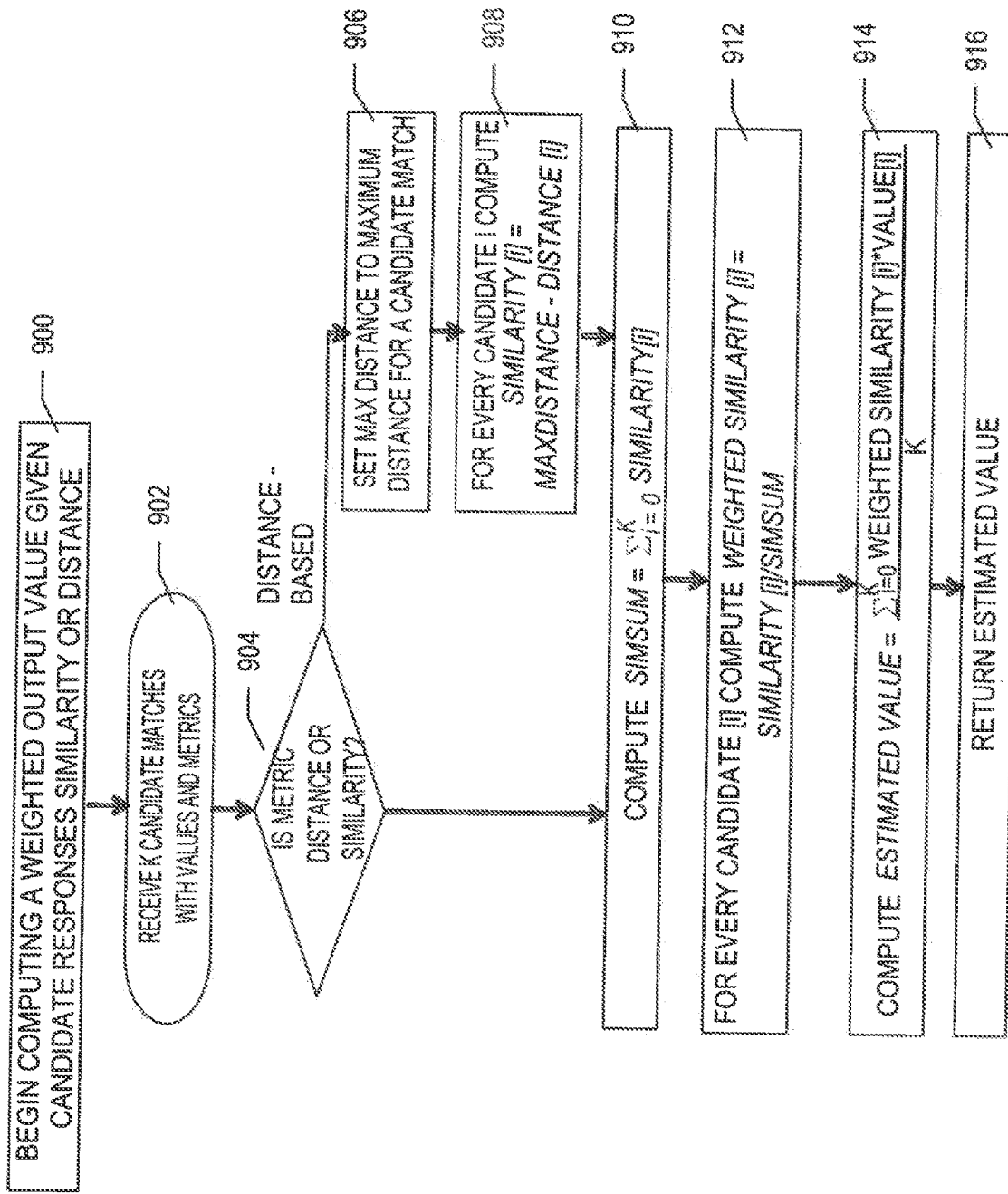

FIG. 11 is a flow chart which depicts merging multiple analyses into a weighted evaluation and expands on Step 818 of FIG. 10 by detailing a simple method for converting multiple candidate results from multiple sources into a single weighted output value base on the similarity or distance metric provided by each. The process begins with Step 900 and the proceeds to Step 902 in which the list of matches with values and metrics are input. The metrics used are preferably either distance or similarity based. In Step 904 a determination is made of whether the metric is distance based or similarity based. If in Step 904 it is determined that the matched condition is distance based, the process proceeds from Step 904 to Step 906. In Step 906 the distance-based metrics are converted into similarity based values in Step 906 and Step 908. In Step 906 the maximum distance for a candidate match is determined and input into Step 908. In Step 908 for every candidate a similarity value is determined. The two determinations for Steps 906 and 908 are shown in the equations below:

For Step 906:

$$\text{maxDistance} = \max_i(\text{distance}[i])$$

For Step 908: similarity [i]=maxDistance-distance [i]

The similarity values of Step 904 and the similarity values determined in Step 906 and Step 908 are input into Step 910, and an average similarity value is determined. In Step 912 a weighted similarity value is determined for each match, and then in Step 914 a combined weighted estimated similarity value is computed.

Given K value estimates in value [ ] and the positive value array similarity [ ] the following are computations performed in Steps 910, 912 and 914:

For Step 910: SimSum=Eko similarity [i]
For Step 912:

$$weightedSimilarity[i] = similarity[i] / SimSum$$

For Step 914:

$$estimatedValue = \frac{\sum_{i=0}^{k} weightedSimilarity[i] * value[i]}{K}$$

In Step 916 the combined, or merged, weighted similarity value is returned to Step 818 of FIG. 10.

Figure 12:
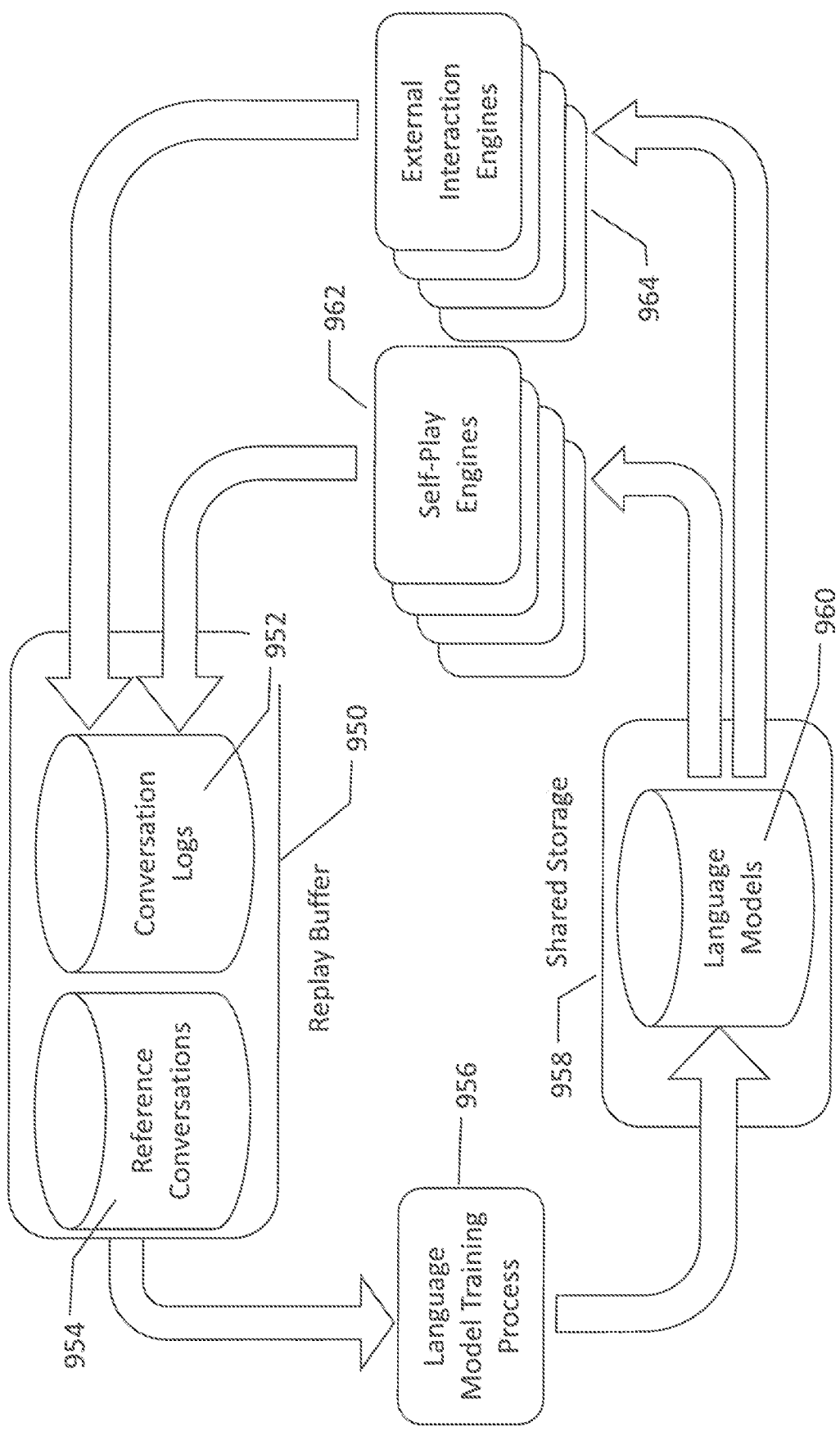

FIG. 12 is a schematic diagram depicting an apparatus for self-learning through application of a self-play feedback loop. The "Replay Buffer" 950 is the memory of conversation logs 952 (corresponding to conversation logs 116 in FIG. 2) and special training logs provided by reference conversations 954 (corresponding to conversation logs 114 in FIG. 2). The replay buffer 950 preferably includes both the human sourced corpora and the self-play logs. The "Shared Storage" 958 is the set of generated models 960 (corresponding to the language model 110 of FIG. 2). It contains any fine-tuned language model networks trained on the sum total of the Replay Buffer 950. One or more Self-Play engines 962 (corresponding to self-play engine 124 in FIG. 2), takes the latest language model image 960 from "Shared Storage" 958 and generates new conversation logs 952. It may do this using a special "interesting prompt list" provided by the start point data 126 of FIG. 2, where different prompts are used, or it can use unconditional prompting. The output of each self-play engine run goes to its own section in the Replay Buffer 950. The AI language virtual agent or apparatus for self learning, can include a feedback mechanism that allows the external agents to rate and review the performance and the responses of the AI language virtual agent, which then is analyzed and used for self-improvement and learning.

The Trainer process 956 (corresponding to the language model training process 112 in FIG. 2) does a scan of the text in the Replay Buffer to create a training corpus, trains the language model training process 112 of FIG. 2 (Transformer-based, probabilistic, RNN or otherwise), and generates new language models 960 which are model images kept in Shared Storage 958. In addition to the internal self-play engines 962 additional External Interaction Engines 964 may be included which encapsulate systems that use the language models 960 to interact with the external world, and generate additional conversational logs 952. There may be one or more self-pay engines 962 and External Interaction Engines 964 existing and running in parallel in a given system.

Figure 13:
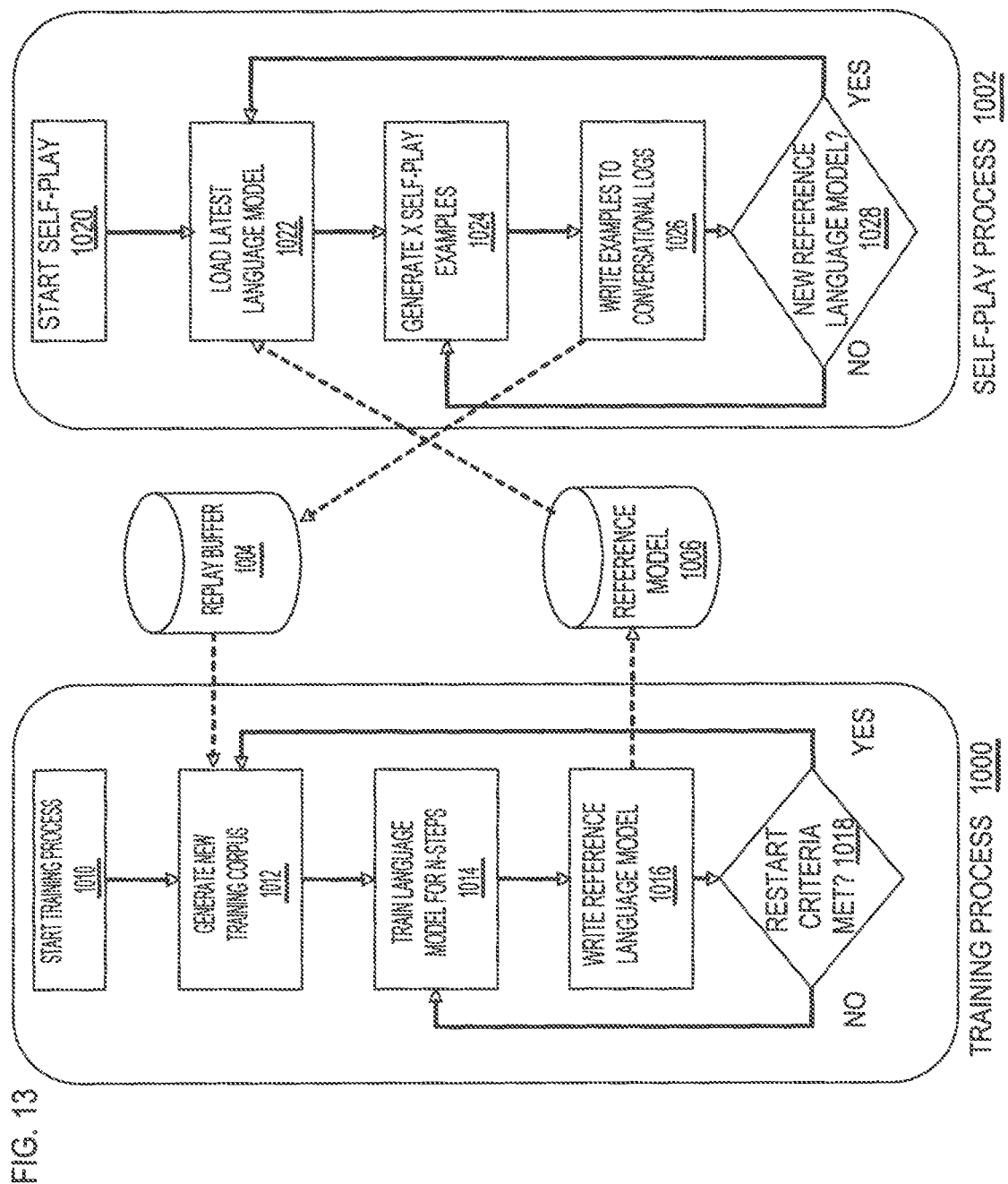

FIG. 13 is a schematic diagram depicting an apparatus for interlocking training and self-play processes. A trainer process loop 1000 loads its initial parameters on startup 1010 and generates a reference corpus from the relevant Replay buffer set 1012, then trains the language model for N Steps 1014, writes the resulting updated language model out 1016 as a new reference model in the shared image file 1006. A determination 1018 is made as to whether a new corpus for training is generated 1012 or the existing corpus is used to continue to update the existing model 1014. The training process 1014 which is stated as being for N steps, can be any of the standard criteria such as N-steps, T amount of wall clock time, reduction in measure error past a threshold, etc. A number of restart criteria 1018 can be specified. One criteria could be based on a fixed number of iterations. Another criteria would be on the amount of new content added to the Replay Buffer 1004. It may also restart the process after every T-time units. Also Step 1014 may terminate early based on time or change in the replay buffer contents.

The Self-play engines use a similar processing loop 1002. First, they load their initial parameters 1020 and then load the latest shared image 1022 provided by the Training Process 1000. Each Self-play engine simulates a number of interactions 1024, recording each as a trace file stored in the Replay Buffer 1026, 1004. Each replay engine then determines if the model it is using is "stale" relative to available models 1028 and, if so, loads the new language model 1022; otherwise, it continues to generate new examples using the existing model 1024. By having the Trainer and Self-Play engines implemented as independent processes provides a number of benefits. The interoperation of the two roles are "near embarrassingly parallel", since other than the startup either role can continue to generate useful work without requiring blocking synchronization from the other. They can provide the option of running continuously and asynchronously. They can operate on a single system or run on multiple independent networked processors or computers either centrally located or widely distributed. Such an arrangement provides the benefits of natural flexibility, scalability and redundancy.

Fortunately, the self-play process requires less processing power than training to generate content and its task can be performed by an individual processor much more modest than Trainer. The Trainer on the other hand benefits from being a central process with maximal processing power or efficiency (a GPU/TPU system). The pool of self-play engines can be implemented locally on one system or on a cluster of multiple computers of different processing power. A cluster of self-play engines may be either tightly coupled or loosely coupled and widely distributed.

Ideally, it is desirable to have a simple, easy to configure system where one can simply add self-play engines to a virtual network and they start producing input to the Replay Buffer 1004. This can also be implemented as a Grid computing model, where during initialization 1020 and model testing 1028 each remote self-play engine would retrieve a URL for the current best available language model. It starts producing output, compresses and uploads the result to a Replay Buffer implemented through an internet cloud-based repository. CloudTurbine provides an example of implementation of a distributed system using a cloud-based file-sharing communication model, (such as Dropbox or Amazon S3). Dedicated network file-storage infrastructure of course may also be used.

Another modification is to have individual Trainer processes sub-sample the entire Replay Buffer, so the training set it uses is representative but does not require the use of the whole buffer. This can allow faster cycling of the training loop 1000 since the corpus construction phase can be substantial as time passes and the Replay Buffer 1004 increases in size. One can also have a sliding window or exponential decay weighting for the sampling process, such that older data is given lesser weight than new data. Such a system would also allow a core set of data in the Replay Buffer to be given a fixed constant priority. Such a preference weighting could be used to give direct experience from external sources 964 a preferential weighting over self-play 962 generated traces.

Figure 14:
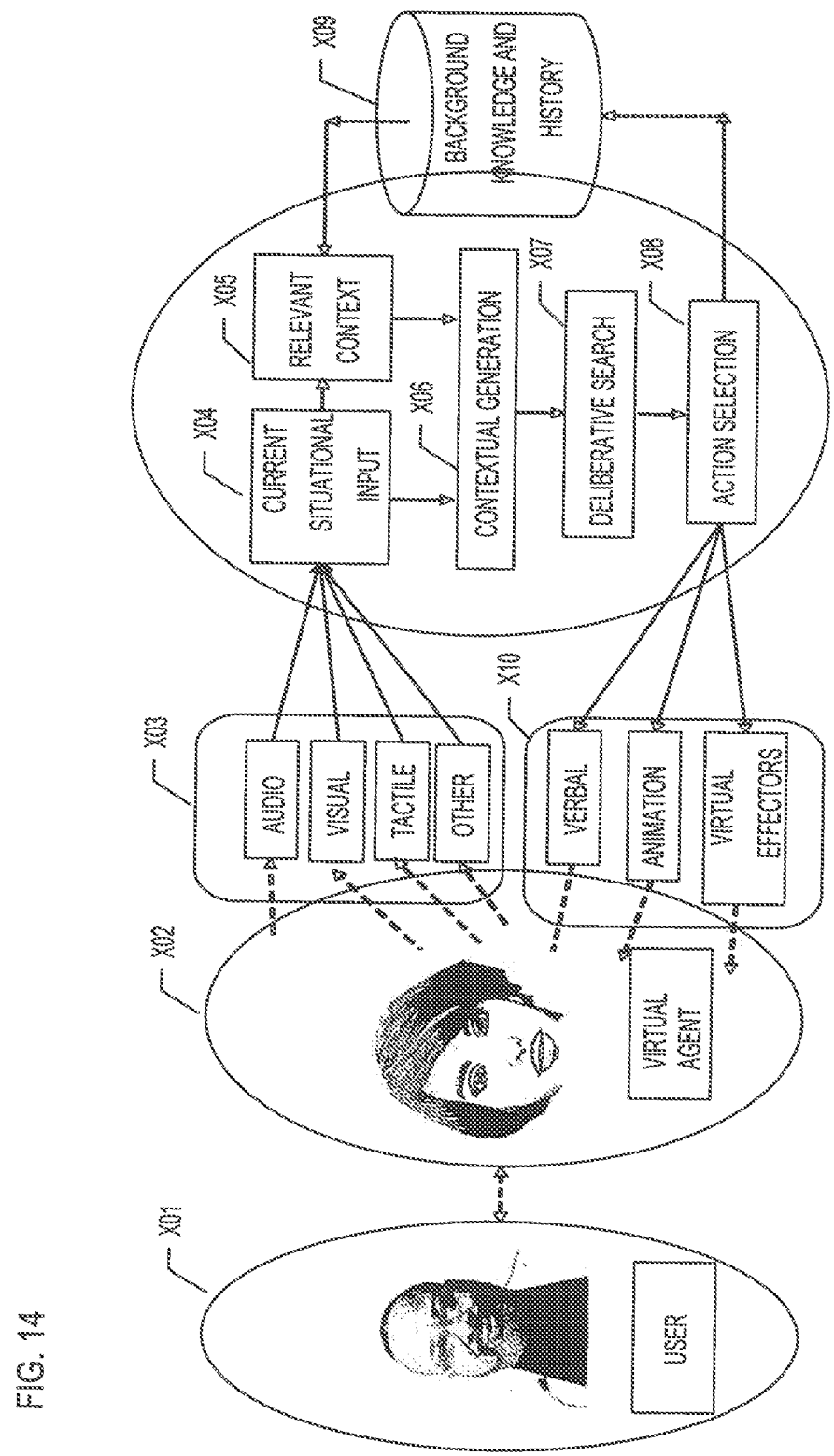

FIG. 14 is a schematic diagram depicting a design of an agent for generating linguistic responses to verbal and situational input and illustrates the use of the deliberative process with a simulated agent. User x01 corresponds to user 100 in FIG. 1. Simulated agent x02 may be physically embodied, virtually simulated in virtual reality or augmented reality, or wholly exist in an abstract simulated state. User x01 provides inputs to simulated agent x02, which x02 captures and encodes via processes in x03, to create the current situational input represented by x04. X04 provides information to x05 to select information to form the context description from relevant background knowledge and recent history. Process x04, x05 and x06 corresponds to Step 002 in FIG. 1, and Steps 102 and 104 in FIG. 2. X07 is the deliberative search process and corresponds to Step 003 and processor 106. X08 is the action extraction and selection process and corresponds to Step 005. X09 corresponds to the short- and long-term experience memories. X10 translates the action selected by x08, and executes them either as verbal actions, animations or virtual operations (i.e. web search, directed calculation, control operations, etc.). X10 corresponds to 007. The primary purpose of the system is to allow the simulated agent x02 to exhibit more intelligent behavior through simulation and evaluation of the near-term consequences, through the use of a situational descriptions (optionally encoded as natural language) using collected experience and knowledge (especially collected and encoded in natural language).

Figure 15:
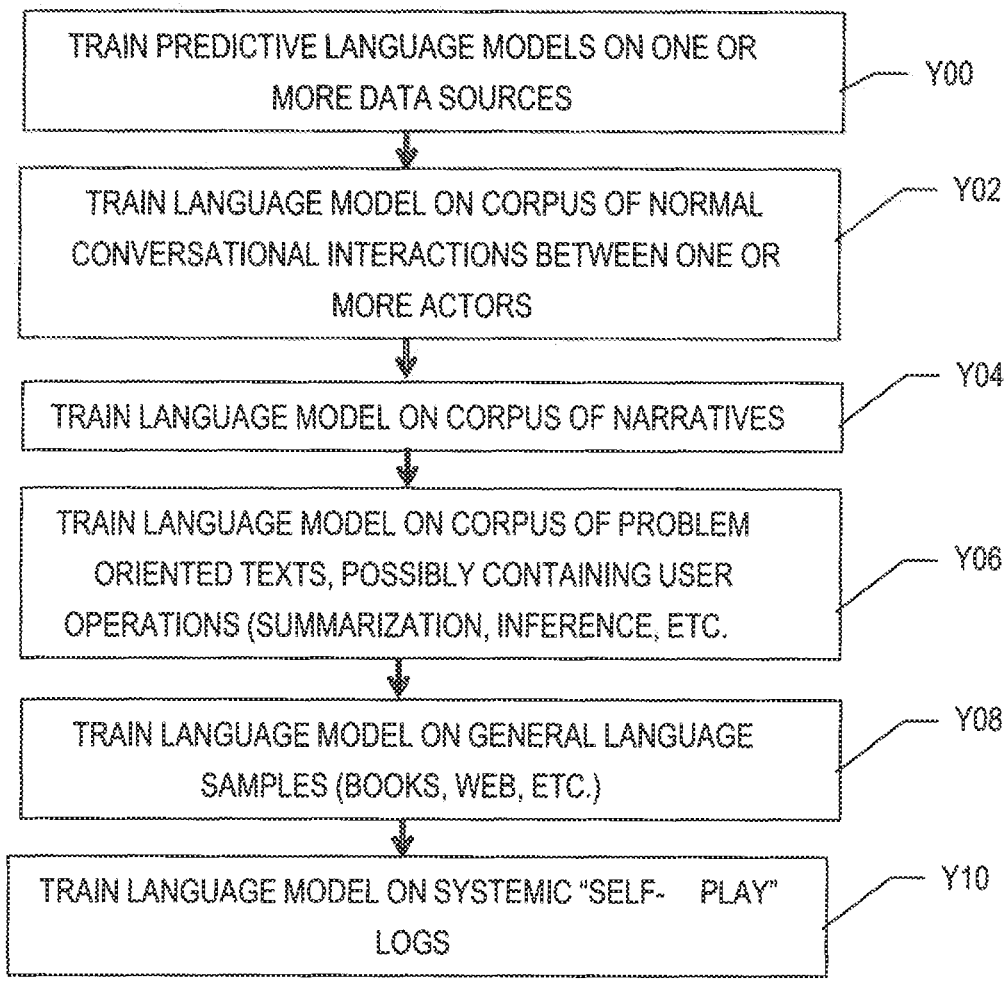

FIG. 15 is a flow chart depicting a training process required for a broad coverage agent using predictive language models. Some embodiments utilize one or more trained generative or predictive language models which are trained on one or more data sources. Such data sources need to include examples of producing next-Steps actions, responses and evaluative statements in the target domain (which may be very broad). As such the corpus of training material will determine the performance of the overall system, both by its selection of initial options and actions, the plausibility of the continuations used in node expansion, and the eventual evaluation statements prompted at the leaves of the search process. It is thus recommended that for broad coverage applications (general chatbot, personal companion, etc.) that Steps y02, y04, y06, and y08 be employed. The AI language virtual agent can be capable of expanding upon tree of thought reasoning where the AI deliberates on a multitude of divergent conversation paths before deciding upon the most contextually strategic and beneficial response. In at least one example, this is akin to a grandmaster contemplating multiple potential moves in Chess, the agent visualizes a diverse range of dialogue continuations and selects responses that serve a broader conversational or functional strategy. This ability improves the overall quality of discourse and can be especially useful in complex and strategic discussions in domains like business, financial planning, politics, or even crisis management.

Optionally, y10 may be employed where the system operates in an internal feedback loop to generate simulated conversation logs which are used as additional training material. Self-play provides additional material to reinforce the initial option generation function to produce output more likely to lead to positive outcomes. Unsupervised self-play combined with state space search has shown excellent results in games requiring human interaction. An AI language virtual agent may employ reinforcement learning or deep reinforcement learning techniques in combination with language models and tree search methods to optimize textual responses. For example, this can have the effective of a feedback loop that is constantly evaluating responses to ensure that the most accurate ones are utilized.

FIG. 16 is a schematic diagram for providing an informational funnel to construct Immediate Situational Descriptions and details the informational funnel, from external sensors to immediate situational description. Simple modifications of the context description provided to a language model can produce very different results. During normal operation in chatbot mode the interaction is presented to variants of OpenAI's GPT system in what we refer to as "screenplay format", consisting of lines with the speaker's name and what they said. A normal input prompt contains the back and forth conversation log followed by the bot name and an open quotation mark, asking the system to generate what the bot is expected to say. The conversational log format is what is collected from users and what is collected from both internet and textual sources. Part of the training dataset for a general chatbot includes movie and tv transcripts. However, we also include normal text, fiction (from various sources, lengths and formats), and a corpus of novels from various genres of literature (action, romance, sci-fi, adult, etc.).

While conversations with the system has good quality, when employed with an embodied agent the output generated lack a certain situational responsiveness. This was to be expected, given the information of only the words spoken between actors. A slot for an immediate situational description was placed between the human actor spoken line and the prompt for bot's response. This situational description corresponds to what would be immediately sensed by an embodied agent, such as "She could see him looking at her", "She could feel his touch" or "She was in a happy mood." Such situational descriptions added between the actor's lines significantly improved the output and responsiveness, even though the system was not trained on text in that format. The additional input helps the system interpret the prior input and conditionalizes the generated output.

Having this slot provides a way for placing non-verbalized sensing and motivational information to influence response generation. In the embodied agent use case, this additional information slot provides for the inclusion of simple mappings from sensor input and user descriptions. The flow outlined below and illustrated FIG. 16 is similar to Baar's Global Workspace attentional funnel.

Z00 corresponds to the sensory input of the simulated agent x02, and contains inputs from different sense modalities (audio, visual, tactile, kinematics, etc.). In addition, z02 contains input from various non-symbolic emotional simulations while z04 contains input from various motivational simulations. Information from these sources may be collected in z08 (which corresponds to x03), which acts as a sensory buffer, and encapsulates both the verbal and non-verbal description of the systems state. In addition, other language processors (z06) may be in employed and operate in parallel. The various sensory inputs in z08 are translated into verbal equivalents and merged with any inputs from z06 to form a complete list of linguistic descriptions and translations that describe the immediate situation at some time T (z10). This list is priority sorted and merged into a final Immediate Situational Description (ISD) at z12 which forms the input to x04 and part of the scene description of step 102 in FIG. 1. An AI language virtual agent can employ reinforcement learning or deep reinforcement learning techniques in combination with language models and tree search methods to optimize textual responses. In other examples, the AI language virtual agent may utilize a dedicated emotion recognition module using multimodal emotion recognition techniques for processing sensory inputs and improving sentiment analysis. This can allow the agent to determine if there are sensory changes needed to a response, as well as analyze large datasets for emotional information. In some examples, the AI language virtual agent may employ a module for understanding visual and auditory metaphors, sarcasms, and idiomatic expressions contributing to improved understanding and delivery of complex responses. Similarly, the AI language virtual agent can incorporate a method to adapt to culture-specific language use, idioms, and expressions based on the information gathered from the user's input or locale. This is very important for situations where there are cross border communications, or multiple languages at play. Additionally, the system can analyze the syntax for proper language variations. The AI language virtual agent can incorporate a learning model for understanding and utilizing emerging online languages, lingoes and slangs that evolves continuously by itself.

Normally the interaction log presented to the language model is in screenplay format. The ISD is inserted between the actors lines to provide necessary contextual annotations to include information that is not captured by the normal dialog exchange.

FIG. 17 is a block diagram for generating and selecting content using entropy density and a fractional knapsack model. A key requirement for utilizing language models with fixed window processing constraints is selecting the most important or relevant information elements for the system to process. This task can be mapped into a modified fractional knapsack problem where the goal is to maximize the information contained in a fixed size processing window. This is an integral concept for 002, 204, and z10-z12. The selection process w00 accepts a list of strings and a total capacity in w02. For each string in the list of strings accepted, it creates an element that contains the length, entropy, entropy density and string index for future reference. In information theory, entropy represents the "surprise" or information content of some event E. This is usually represented as the negative log of the probability of an event. In this case the probability is of a word's occurrence relative to some natural language corpus. To map into a fractional knapsack formulation, the concept of entropy density is created, where the average entropy of each token in each string is estimated. This allows the information content of each string to be compared and the greedy algorithm to be applied in w06 and w08. It is noted that w08 varies from the standard algorithm to admit whole strings. One can admit the standard algorithm if one is allowed to simplify, summarize or otherwise modify the final string selected by the standard algorithm in such a way that it meets the final fractional assignment requirements.

Once w08 completes, the results and final value are returned in w10. The list returned are indexes of the original string list passed that should be included in the processing window. The sorting operation of w06 may be modified to either sort in ascending or descending order. If ascending order is used then the lowest entropy strings are selected first and the most probable events are attended to. Likewise, if the descending order is used, then the most improbable and individually informative events are included. This allows the effects of attentional low and high pass filtering to be realized through symbolic means.

Also, the sources of information accepted by w02 may be heterogeneous and only require the ability to estimate the probability of each element under consideration (in the example, text). The method may be applied to text from multiple languages and events of multiple modalities that can have their entropies measured. The probability may be estimated via uni-gram, bi-gram, n-gram, other language models or any method that can return a probability for each string and thus estimate the entropy. Metrics other than entropy density may also be used. Also, the knapsack planner can be applied recursively over subsets of relevant information. For instance, a certain capacity may be reserved for certain information types in a global context description. Given a list of pending goals or unknown variables, the relative value of the acquiring each may be specified and the most important combination presented, each using a portion of its own reserved capacity. Any capacity that may be unused may be passed on as extra capacity for other slots in the global context description.

In our description one can view a language model to be a blackbox that generates a response sequence to an input sequence. There are many methods that can be used to fill that role, using n-grams, rules and patterns, probability networks (Markov models), information retrieval systems (TF-IDF, LSA), and neural nets (RNN's, LSTM's, transformers). While implemented with large scale trained generative pre-trained models like GPT, the architecture still can be implemented with any of the other methods.

In normal operation, the GPU system can generate a long continuation for each prompt. The test system normally generates batches of 4 continuations at a time until it produces enough to meet the limit specified for a given node (say generate 16 possibilities). Each time it produces a continuation, it generates a little bit more (say it is told to generate 64 words), and the extra is trimmed down to make one complete response. This makes the system behave as required for normal tree search.

However, one can request the system produce enough content to reach the normal leaf node (say 256 words). In this case you can break the content produced into turns and apply the evaluation to the content of the leaf. This is the equivalent of looking at just one possible future path for each option, versus looking at a branching tree of futures for each option. The benefit of course is each N options require N generation Steps, instead of N*level1*level2 * . . . * level_max generation Steps. This allows the system to be more responsive without having to give up the future projection ability. While the method is described using a simple evaluation prompt to evaluate the leaf nodes of the created search graph, the method will also work with prompts or their equivalents of arbitrary complexity, design, specification or criteria. While the sentiment to the effective thought chain is prompted and used for illustration, other criteria such as completeness, cost, energy, complexity and other criteria may be used. Such criteria can be evaluated in isolation or in combination, and may be evaluated as a single prompt or in parallel with one or more generative or non-generative evaluators. For example, how closely does the chain of reasoning align with the initial input or problem statement? If it doesn't then a new chain of reasoning can be generated. In other examples, if may be a question of the clarity. How understandable is the reasoning? Is it easy to follow or does it involve complex linguistic structures that might be hard to grasp? While in other examples it is coherence that is most important. Does each step in the chain of reasoning logically follow from the one before it? Similarly, if there can be a question of creativity or originality, especially for creative writing purposes. Are there novel or interesting ideas in the reasoning? There are many more including, but not limited to: Consistency: Are there any contradictions or inconsistencies in the reasoning? Specificity: How much detail is provided in the reasoning? Are there specific examples or are they mostly general statements? Persuasiveness: Could the reasoning convincingly sway someone's opinion or decision? Precision: Does the chain of reasoning use precise language, or is it vague and ambiguous? Fluidity: Does the conversation flow naturally from one point to the next? Appropriateness: How suitable is the reasoning in a given context or audience? This is not an exhaustive list, but illustrates that criteria other than sentiment may be used for the evaluation process. Each criteria defines a separate dimension of evaluation, each of which can be individually weighed and the aggregate can be used to form a final evaluation score. Such a system allows dynamic respecification of different criteria importance, and either allowing a user or system to explore how those weightings would affect different outcomes, and the relative weightings are a domain for systemic learning (learn what is important in which situation). The architecture of multi-dimensional and multi-factor evaluation functions and their efficient execution and evaluation is well covered by the game tree search literature.

One can also truncate the generation of content in the middle levels, as long as the content generated is sufficient to "sketch the outline of future development". In some cases, it is sufficient to just detect the fact that an argument will ensue, not the full details of the argument. By specifying a truncated generation process, one can speed up the overall search response.

Through the use of iterated search one can use smaller/simpler models. The system internal dialog simulation allows it to predict negative outcomes and give preference to responses that lead to positive outcomes.

Information passed from the front end to the processing system to generate a response may include:

Maximum depth and expansion at each level specified
Specify the evaluation function by selection or by formula to be interpreted
Prompt to be used at each level
Literal prompt
Default back and forth prompt
Use of rule based, information retrieval or LM based generation
Option to let a rule-based system evaluate the next generation Step
Additional sensory information or summary of sensory information in the form of NL text
Interpretation of NL text to generate actions including animation In a practical application the linguistic actions may be specified, along with linguistic descriptions of their outcome:

User: It is dark in here.
System: House, turn living room light to maximum.
Living Room light is at maximum. The Living room is very bright.
User: Ah, much better.

The goal-oriented evaluation processor may be trained on material annotated from sources to indicate the achievement of some goal in some interactive session. For instance, achieving some outcome a user may desire, such as solving some problem or performing some service. For instance, achieving some customer service objective (problem resolution, sales, persuasion, etc.) Labeling of such material may be achieved through explicit means (direct confirmation of resolution) or implicit means (user not complaining about problem over some time period). In situations with long or continuous interaction histories, persistent changes in user sentiment may detected and used as a reinforcement signal.

While the preferred embodiment described focuses on the creation and use of a primary LM to perform multiple functions, it is obvious that various elements of the system may be duplicated and operated in parallel to produce multiple LM's tuned for various function and tasks, or to represent various viewpoints or specialties. While methods are described to utilize a single LM for the various functions for processing economy, differing LM's may be used as required to emulate chain of thought or multiple viewpoint debate driven reasoning, or at different stages of the search process. An AI language virtual agent can have the ability to formulate and advance strategic chains of thoughts. As a chain of thought is developed it can allow for there to be many branches in the chain, but there is always a return somewhere to the original chain. Here, the AI does not merely formulate responses based on immediate inputs but can extrapolate and structure a sequence of interconnected thoughts, embedding tactical forethought which allows progression through a dialogue with thematic consistency, deeper context, and strategic direction. This ability to think ahead positions the agent to act as a knowledgeable advisor able to project and articulate a series of cohesive, strategic steps or recommendations. For book writers, and data analysts this is an amazing feature that allows for variations of a story line to be developed and then well rounded to the specific desires of the user interacting with the agent.

In particular, the potentially distributed self-play process which utilizes one or more engines to generate the conversational logs used for training (962) may utilize multiple diverse LM's in their individual operation in order to simulate the interaction of multiple agents with multiple viewpoints or styles of expression.

Self-play engines (962) and external interaction engines (964) may optionally include non-LM driven sources such as logical proof generators, planning system, inference engines and simulators. The only requirement is that the output of such generators be of a format that may be integrated with the general interaction data format and the remainder of the interaction data. Such tools may provide detailed examples to the system of reasoning, explanation, planning behavior, or the ability to predict outcomes in the simulated domain. Such methods may also provide systematically generated examples of dialogs for verifying the truth of statements or positions. Also, such engines may incorporate interactions with LM trained by other methods, for example as those using reinforcement learning, human feedback or combinations thereof. An AI language virtual agent may use elements of reinforcement learning or deep reinforcement learning techniques in combination with language models and tree search methods to optimize textual responses. These types of self-play engines and external interaction engines can assist with complex environments but do not always take into account the long term goals. This is where the benefits of including the long term goals and consequences into the analysis through reinforcement or deep reinforcement learning.

The ability to interleave various language processing methods with language modeling during the tree processing steps allows the system to incorporate methods other that sentiment analysis within the evaluation process. In particular the internal and external consistency of a dialog chain may be checked and used as an evaluation criterion. An AI language virtual agent may employ Reinforcement Learning or Deep Reinforcement Learning techniques in combination with language models and tree search methods to optimize textual responses. As these textual responses are optimized the ability to learn real time, or real world textual information allows for new discoveries and/or the ability to generate new responses in real time. In some examples, the AI language virtual agent can include a feedback mechanism that allows the external agents to rate and review the performance and the responses of the AI language virtual agent. This allows the system to learn the accuracy of its responses and allow it to further refine its abilities. Which then allows for analysis, and used for self-improvement and learning. This further allows for the translation of linguistics to sentiment evaluation scores to include modern neural processing.

The ability to translate language and other media types into semantic or latent vectors underlies the operation of many models. The search process may be carried out using this vector representation to represent the states being searched without necessarily operating exclusively on fully realized text. Also, the vector representation may be used to perform comparisons between the generated output and corpora or databases representing a field of interest, prior conversations or knowledge a user or interacting agent may be assumed to be aware of (a body of knowledge). This comparison capability allows the measurement of the similarity or novelty relative to a body of knowledge to be made and used as an evaluation criteria. For instance, it may be desirable to select a mid-range of similarity values such that the output is similar enough to be integrated or interpreted with existing knowledge, yet is novel enough to avoid being redundant. In this way the system may generate conversation that gradually extend the frontier of the body of knowledge without creating topically disjoint conversation. This would correspond to additional goal-oriented analysis performed in (604).

An AI language self-improvement agent can utilize enhanced state space search capabilities, which allows for evaluations to occur at a more rapid pace because the state space is translated into a more efficient representation that preserves the developing context, and then be searched for the most accurate response at any given point during the analysis. In some examples, the AI language virtual agent employs the language models for latent space exploration and optimization by transforming verbal and situational indicia into a lower-dimensional representation that uncovers the underlying semantics, making the state search process more efficient and accurate. As these representations are changed, the agent can perform additional evaluations.

While the primary description is for models to operate from text input to text output, internally it is natural for some systems to translate from multiple modalities (including text) into a common vector representation, perform operations on those vector representations, and then translate the resulting vector back to a final target modality. In particular, the alternate modalities may include (but be not limited to) audio, images of various spectra or physical animation vectors. An example would include a system may receive a textual description, translate the description into a vector representation, perform the search operations using the vector-based state descriptions and perform the evaluation based on either a vector representation of a described state or based on evaluating qualities of a visual rendered image or other media generated from a represented state. For instance, sentiment analysis may be performed using an audio analysis of an audio sample generated from the semantic vector representation.

While a possible low resource sentiment analysis method is described in FIG. 9 and used for node evaluation, other methods that are based on LM's may be utilized provided such methods can return a numeric value which can be used to meet the needs of the search process. The Bidirectional Encoder Representations from Transformer, also known as BERT, and other similar methods may be trained to perform sentiment and other analysis required to return a useful evaluation.

Some problem area addressed by the methods described include:
application of self-play reinforcement learning methods to the domain of language modeling. An AI language virtual agent may use elements of reinforcement learning or deep reinforcement learning techniques in combination with language models and tree search methods to optimize textual responses. The use of reinforcement or deep reinforcement learning can allow for the domain of language modeling to provide more long term outcomes for marketing personalization or optimization challenges just to name a few areas.
agents generating inappropriate responses
agents being insensitive to the consequences of their actions or output
agents being able to respond to sensory inputs and emotional or motivational simulations. The AI language virtual agent can employ a dedicated emotion recognition module using multimodal emotion recognition techniques for processing sensory inputs and improving sentiment analysis.
how to control various aspects of embodied agents and associated systems using language models
provide a method for dynamic real-time unsupervised training of an evaluation classifier
using the trained classifier as a backup to a primary classifier and to provide useful gradient information for search processes
using language models in a summary generation framework
mapping the concept of attention between Textrank-models and GPT/transformer-models
translation of sensing into natural language and the generation of an immediate virtual scene description
generating a dynamic specification of a formula to use in the evaluation process
formulation of information packets between user facing front-end and backend processes specify details such as classifiers to be used, evaluation functions, agent profiles, role, etc.
specification of required prompt and expansion factor at each level of the tree search process
principles allowing the evaluation of a single non-tree search generation thread but using N-single extensions with evaluation applied to the end of each
dynamically generating the context window from a number of information sources by reformulating it as a fractional knapsack problem where:
weight=length of text
capacity=window size
value=priority/info content The present invention provides advantages of a simulated virtual agent which responds with textual expression to textual input from external user and external virtual agents in combination with the audio, visual, and tactile inputs. The textual expression from the virtual agent being generated by processes utilizing one or more language models, self-moving modules, and both current and prior conversation and interaction logs with self-learning reference conversations in combination with MCTS processes and self-learning techniques. Selection of the virtual agent's responses including simulated sentiment analysis and goal-oriented analysis to assign values which are weighted, normalized, and merged in selecting textual responses through internal self-discussion tree search techniques.

Although the preferred embodiment has been described in detail, it should be understood that various changes, substitutions and alterations can be made therein without departing from the spirit and scope of the invention as defined by the appended claims.

What is claimed is:

1. An Artificial Intelligence (AI) language virtual agent having self-improvement features which incorporate language modeling and tree search, the virtual agent comprising:
    a data processing system having program instructions implementing the virtual agent;
    the implemented virtual agent accepting as input a current situational description that includes natural language input received from an external agent, properties regarding the qualities of the virtual agent, and indicia regarding subject matter context of a present conversation;
        wherein the qualities of the virtual agent include temperament and textual tendencies;
        wherein the indicia regarding subject matter context includes textual logs from recent conversational exchanges;
        wherein the current situational description includes audio, visual, and tactile inputs from the external agent which are collected proximate to the virtual agent;
        wherein the virtual agent employs reinforcement learning;
    a database of one or more language models, conversation logs storing text from prior textual exchanges, and reference conversations for training;
    a combination of self-play engines that train on the language models with self-play and external interaction engines for communicating with external agents; and
    a combination of self-moving modules that advance the method of the external agent communicating with the virtual agent via a combination of textual exchanges and one or more audio, visual, and tactile inputs into the virtual agent; and
    wherein the virtual agent utilizing tree search techniques in combination with the one or more language models for outputting optimized responses to the current situation description, and wherein the virtual agent responds with self-optimized textual expression to verbal input in combination with the audio, visual, tactile, and other sensory inputs.

2. The AI language virtual agent according to claim 1, wherein the virtual agent is further configured to:
    select an optimal response to a current situation description with respect to immediate and non-immediate goals and outcomes by using one or more language models to form the optimal response search process;
    wherein the language models are used to anticipate future outcomes and future responses;
    wherein the language models are also used to evaluate the desirability of projected future outcomes;
    convert the language models evaluation into a format suitable to guide tree search methods; and
    wherein information regarding the desired goals or outcomes may be included in the current situational description.

3. The AI language virtual agent according to claim 1, further comprising a feedback mechanism that allows the external agent to rate and review the performance of the responses.

4. The AI language virtual agent according to claim 1, further comprising a dedicated emotion recognition module using multimodal emotion recognition.

5. The AI language virtual agent according to claim 1, further comprising a module for understanding visual and auditory metaphors, sarcasms, and idiomatic expressions.

6. The AI language virtual agent according to claim 1, wherein the virtual agent is further configured to:
    utilize one or more language models to generate evaluative statements or annotations on the desirability of a situational description;
    translate symbolic evaluative statements into numeric or vector format suitable for use in common state space search systems;
    select an initial action from an initial set based on the outcome of the complete search process;
    perform an action or set of actions based on the initial action selected;
    record the system and environmental interactions to one or more logs;
    provide for the continuing training of the language models used by the virtual agent using reference material and direct experience; and
    provide self-improvement of the entire process through iterative retraining of the language models, and through use of self-play to explore the space of novel possible situations and to discover paths towards positive resolutions in those situations.

7. The AI virtual agent according to claim 1, further comprising a learning module for understanding and utilizing emerging online languages, lingoes, and slangs that evolve continuously.

8. An Artificial Intelligence (AI) language virtual agent having self-improvement features which incorporate language modeling and tree search techniques, the AI language virtual agent comprising:
    a data processing system having program instructions implementing the AI language virtual agent;
    sensory inputs having one or more audio, visual, and tactile receptors located proximate to the virtual agent for collecting indicia of verbal and situational indexes, wherein said sensory inputs are connected to said data processing system for inputting the indicia of verbal and situational indexes;
    said data processing system processing said indicia of verbal and situational indexes to define a current situational description;
    said current situational description including natural language input, qualities of the virtual agent, and indicia regarding subject matter context of a present conversation, wherein said qualities of the virtual agent include temperament and textual tendencies, and the indicia regarding subject matter context includes textual logs from recent conversational exchanges;
    wherein the virtual agent employs reinforcement learning;
    a database adapted for access by said data processing system and having one or more language models, conversation logs storing text from prior textual exchanges, and reference conversations for training;
    one or more self-play engines for training said one or more language models with self-play; and wherein the AI virtual agent utilizes tree search techniques in combination with said one or more language models for outputting textual responses to the current situation description.

9. The AI language virtual agent according to claim 8, wherein the virtual agent utilizes Monte Carlo Tree Search (MCTS) techniques in combination with the one or more language models for outputting textual responses to the current situation description;

wherein the virtual agent responds with textual expression to verbal input in combination with the audio, visual, tactile, and other sensory inputs after merging an analysis of basic sentiment analysis and goal-oriented analysis of the AI virtual agent; and wherein the sentiment analysis is determined by the text being tokenized into a list of words and phrases, a sentiment value is assigned for each token in which a summation of the sentiment values are computed and then normalized as compared to an expected value to determine respective normalized scores, and then the respective normalized scores are compared to one or more indexes which are summed to provide discrete output values which provide a respective sentiment value for the text being analyzed;

wherein the virtual agent may engage with proof of work system.

10. The AI language virtual agent according to claim 8, wherein the virtual agent is further configured to:

select an optimal response to a current situation description with respect to immediate and non-immediate goals or outcomes by using one or more language models to form the optimal response search process;

said virtual agent further comprising a contextual interface interchangeable with an external state simulator or server that maintains real-time tracking of global states, and wherein the interface accommodates natural language instructions or action mandates from the AI virtual agent and reciprocates with natural language descriptions of the current state.

11. The AI language virtual agent according to claim 10, wherein the external state simulator or server provides comprehensive account keeping details in addition to producing numeric evaluations of the state, enhancing the agent's understanding of the surrounding environment.

12. The AI language virtual agent according to claim 8, wherein the virtual agent incorporates LLM capable of producing executable code given a problem description, thereby providing a viable solution to the specified problem.

13. The AI language virtual agent according to claim 8, wherein the LLM drives a dynamic state simulator by generating executable code that alters one state representation into another, demonstrating a broader state expansion and efficient leaf evaluation.

14. The AI language virtual agent according to claim 8, wherein the virtual agent utilizes any available resources, planning, or computing capabilities by virtue of the code produced for state expansion and leaf evaluation to provide optimum responses.

15. The AI language virtual agent according to claim 8, wherein the output generated through the dynamic state simulation driven by LLM-written code is translatable into natural language or various compatible embeddings for improved interaction with external agents.

16. An Artificial Intelligence (AI) language virtual agent having self-improvement features which incorporate language modeling and tree search techniques, the AI language virtual agent comprising:

a data processing system having program instructions implementing the AI language virtual agent;

sensory inputs having one or more audio, visual, and tactile receptors located proximate to the virtual agent for collecting indicia of verbal and situational indexes, wherein said sensory inputs are connected to said data processing system for inputting the indicia of verbal and situational indexes;

wherein said data processing system processing said indicia of verbal and situational indexes to define a current situational description;

said current situational description including natural language input, qualities of the virtual agent, and indicia regarding subject matter context of a present conversation, wherein said qualities of the virtual agent include temperament and textual tendencies, and the indicia regarding subject matter context includes textual logs from recent conversational exchanges;

a database adapted for access by said data processing system and having one or more language models, conversation logs storing text from prior textual exchanges, and reference conversations for training;

one or more self-play engines training said one or more language models with self-play; and wherein the AI virtual agent utilizes Monte Carlo Tree Search (MCTS) techniques in combination with said one or more language models for outputting textual responses to the current situation description; and wherein the AI language virtual agent employs the language models for latent space exploration and optimization by transforming verbal and situational indicia into a lower-dimensional or alternate representation that uncovers the underlying semantics, making the state search process more efficient and accurate.

17. The AI language virtual agent according to claim 16, wherein the virtual agent is further configured to:

select an optimal response to a current situation description with respect to immediate and non-immediate goals and outcomes by using one or more language models to form the optimal response search process;

wherein the language models are used to anticipate future outcomes and future responses;

wherein the language models are also used to evaluate the desirability of projected future outcomes;

convert the language models evaluation into a format suitable to guide tree search methods;

wherein information regarding the desired goals or outcomes may be included in the current situational description;

wherein the virtual agent utilizes MCTS techniques in combination with the one or more language models for outputting textual responses to the current situation description;

wherein the virtual agent responds with textual expression to verbal input in combination with the audio, visual, tactile, and other sensory inputs after merging an analysis of basic sentiment analysis and goal oriented analysis of the AI virtual agent; and wherein the sentiment analysis is determined by the text being tokenized into a list of words and phrases, a sentiment value is assigned for teach token in which a summation of the sentiment values are computed and then normalized as compared to an expected value to determine respective normalized scores, and then the respective normalized scores are compared to one or more indexes which are summed to provide discrete output values which provide a respective sentiment value for the text being analyzed; and wherein the virtual agent employs a dedicated emotion recognition module using multimodal emotion recognition techniques for processing sensory inputs and improving sentiment analysis.

18. The AI language virtual agent according to claim 16, wherein the virtual agent is further configured to:

construct the contextual descriptions to maximally represent the current situation while meeting any processing constraints of the language models used;

provide nodes of the states of the search space which contain contextual descriptions and search control information;

receive an initial starting contextual description and search control information; and explore the state of possible future contexts by using one or more language models provided with sufficient information in the form of the contextual descriptions and prompts that cause the generation of new situation descriptions;

wherein a blockchain-based secure database may be utilized for storing and accessing the data for training and self-play in a secure, transparent and immutable manner.

19. The AI language virtual agent according to claim 16, further comprising:

a contextual interface interchangeable with an external state simulator or server that maintains real-time tracking of global states, and wherein the interface accommodates natural language instructions or action mandates from the AI agent and reciprocates with natural language descriptions of the current state.

20. The AI language virtual agent according to claim 19, wherein the external state simulator or server provides comprehensive account keeping details in addition to producing numeric evaluations of the state, enhancing the agent's understanding of the surrounding environment and its responses to the same.

* * * * *